US012707383B2

(12) United States Patent
Sun et al.

(10) Patent No.: US 12,707,383 B2
(45) Date of Patent: Aug. 11, 2026

(54) MOBILE RELAY POSITIONING USING PHYSICAL CELL IDENTIFIERS (PCI)

(71) Applicant: HUAWEI TECHNOLOGIES CO., LTD., Shenzhen (CN)

(72) Inventors: Fei Sun, Shanghai (CN); Haiyan Luo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 316 days.

(21) Appl. No.: 18/397,195

(22) Filed: Dec. 27, 2023

(65) Prior Publication Data

US 2024/0129848 A1 Apr. 18, 2024

Related U.S. Application Data

(63) Continuation of application No. PCT/CN2022/094076, filed on May 20, 2022.

(30) Foreign Application Priority Data

Jun. 30, 2021 (CN) ......................... 202110733932.7

(51) Int. Cl.
*H04W 48/20* (2009.01)
*H04W 36/32* (2009.01)
(Continued)

(52) U.S. Cl.
CPC ........... *H04W 48/20* (2013.01); *H04W 36/32* (2013.01); *H04W 48/16* (2013.01); *H04W 84/005* (2013.01)

(58) Field of Classification Search
CPC ..... H04W 48/20; H04W 36/32; H04W 48/16; H04W 84/005; H04W 36/0061;
(Continued)

(56) References Cited

U.S. PATENT DOCUMENTS

2012/0329461 A1* 12/2012 Teyeb ............. H04W 36/00835 455/437
2013/0183971 A1 7/2013 Tamaki et al.
(Continued)

FOREIGN PATENT DOCUMENTS

| | | | |
|---|---|---|---|
| CN | 103533656 | A | 1/2014 |
| CN | 104509162 | A | 4/2015 |
| KR | 20160092391 | A | 8/2016 |

OTHER PUBLICATIONS

3GPP TR 22.839 V1.0.0 (Jun. 2021) "3rd Generation Partnership Project; Technical Specification Group Services and System Aspects; Study on Vehicle-Mounted Relays; Stage 1 (Release18)," 54 total pages.

(Continued)

*Primary Examiner* — Rushil P. Sampat
(74) *Attorney, Agent, or Firm* — Rimon PC

(57) ABSTRACT

This application provides a method of obtaining information. According to the method, a mobile relay device moves to a permitted area in which the mobile relay device is allowed to use a relay function, where the permitted area is a cell covered by a donor base station. The mobile relay device obtains, in the permitted area, a physical cell identifier (PCI) of a relay cell through which the relay function is provided for a terminal device, where the relay cell is a cell accessed by the terminal device. In this way, the mobile relay device can obtain the PCI, and provide a relay service for the terminal device served by the mobile relay device.

20 Claims, 7 Drawing Sheets

(51) Int. Cl.
*H04W 48/16* (2009.01)
*H04W 84/00* (2009.01)

(58) Field of Classification Search
CPC ....... H04W 36/00837; H04W 36/0088; H04W 36/322; H04W 36/324; H04W 8/186
See application file for complete search history.

(56) References Cited

U.S. PATENT DOCUMENTS

2013/0229946 A1* 9/2013 Wang .................... H04W 24/02 370/254
2013/0303081 A1* 11/2013 Chang ............... H04W 36/0061 455/524
2014/0192781 A1* 7/2014 Teyeb ................... H04W 36/34 370/328

OTHER PUBLICATIONS

3GPP TS 36.211 V16.6.0 (Jun. 2021) "3rd Generation Partnership Project; Technical Specification Group Radio Access Network; Evolved Universal Terrestrial Radio Access (E-UTRA); Physical channels and modulation (Release 16)," 249 total pages.
3GPP TS 38.211 V16.6.0 (Jun. 2021) "3rd Generation Partnership Project; Technical Specification Group Radio Access Network; NR; Physical channels and modulation (Release 16)," 134 total pages.
3GPP TS 23.501 V17.1.1 (Jun. 2021) "3rd Generation Partnership Project; Technical Specification Group Services and System Aspects; System architecture for the 5G System (5GS); Stage 2 (Release 17)," 526 total pages.

* cited by examiner

MOBILE RELAY POSITIONING USING PHYSICAL CELL IDENTIFIERS (PCI)

CROSS-REFERENCE TO RELATED APPLICATIONS

This application is a continuation of International Application No. PCT/CN2022/094076, filed on May 20, 2022, which claims priority to Chinese Patent Application No. 202110733932.7, filed on Jun. 30, 2021. The aforementioned applications are hereby incorporated by reference in their entireties.

TECHNICAL FIELD

This application relates to the field of communications, and more specifically, to a method of obtaining information and a communications apparatus.

BACKGROUND

A vehicle-mounted base station relay (VMR) is a small vehicle-mounted base station relay deployed on a mobile vehicle that is wirelessly connected to a macro radio access network (RAN) node, namely, a donor base station (e.g. Donor gNB), thereby connecting the VMR to a network. Thus, the VMR can provide network coverage and communication for user equipment (UE) in or near the vehicle.

However, as the vehicle moves, the vehicle-mounted base station relay cannot accurately provide a relay service in a working area. In addition, when the vehicle-mounted base station relay moves out of the working area, continuity of service to the UE served by the vehicle-mounted base station relay cannot be ensured. Therefore, how to improve a capability of the vehicle-mounted base station relay to better provide the relay service to the UE while the vehicle is moving becomes a problem to be resolved.

Therefore, this application provides a method of obtaining information of obtaining information and a communication apparatus, to alleviate the foregoing problem.

SUMMARY

This application provides a method of obtaining information and a communication apparatus, to obtain a PCI of a relay cell through which a relay function is provided for a terminal device. In this way, a mobile relay device can provide a relay service for the terminal device served by the mobile relay device, so that the mobile relay device can accurately provide the relay service in a working area when the mobile relay device serves as a vehicle-mounted base station relay when the vehicle is in motion.

According to a first aspect, a method of obtaining information is provided, and includes: A mobile relay device moves to a permitted area in which the mobile relay device is allowed to use a relay function, where the permitted area is a cell covered by a donor base station. The mobile relay device obtains, in the permitted area, a physical cell identifier (PCI) of a relay cell through which the relay function is provided for a terminal device, where the relay cell is a cell accessed by the terminal device.

Based on the foregoing solution, the mobile relay device can obtain, in the permitted area, the PCI of the relay cell through which the relay function is provided for the terminal device. In this way, the mobile relay device can provide a relay service for the terminal device served by the mobile relay device, so that the mobile relay device can accurately provide the relay service in a working area when the mobile relay device serves as a vehicle-mounted base station relay when the vehicle is in motion.

With reference to the first aspect, in some implementations of the first aspect, the method further includes: The mobile relay device sends first information to a network device, where the first information indicates at least one of a provider of the mobile relay device and an application layer service supported by the mobile relay device.

The provider of the mobile relay device may include an internet service provider (ISP) to which the mobile relay device belongs. For example, the mobile relay device may be deployed in a bus, a taxi, or online car-hailing, and leased to different network companies to provide a service; or may be deployed by an operator to provide an access enhancement service. The application layer service supported by the mobile relay device includes supported application (App) information. For example, some mobile relay devices each provide a connection service only for a specific application, and a terminal device that subscribes to a related service may access the corresponding mobile relay devices.

With reference to the first aspect, in some implementations of the first aspect, the method further includes: The mobile relay device receives second information from the network device, where the second information indicates the permitted area. That the mobile relay device obtains a PCI of a relay cell through which the relay function is provided for a terminal device includes: The mobile relay device obtains, based on the second information, the PCI of the relay cell through which the relay function is provided for the terminal device.

The permitted area is the cell covered by the donor base station, and information about the permitted area may be obtained by the mobile relay device in any of the following forms:

1. an identifier of a donor cell that is broadcast by the donor base station;
2. an identifier of the donor base station that is broadcast by the donor base station;
3. a tracking area code of a donor cell that is broadcast by the donor base station;
4. a radio access network area code of a donor cell that is broadcast by the donor base station;
5. a PCI of a donor cell that is broadcast by the donor base station, or a primary synchronization signal/secondary synchronization signal (PSS/SSS) of the donor cell;
6. a permitted area code of the donor base station that is broadcast by the donor base station; or
7. a permitted area code of a donor cell that is broadcast by the donor base station.

With reference to the first aspect, in some implementations of the first aspect, the method further includes: Information about the permitted area is preconfigured when the mobile relay device is produced.

For example, the mobile relay device may determine, based on a mapping relationship between the identifier of the donor cell that is broadcast by the donor base station, the identifier of the donor base station that is broadcast by the donor base station, the tracking area code or the radio access network area code that is of the donor cell and that is broadcast by the donor base station, the PCI that is of the donor cell and that is broadcast by the donor base station, the permitted area code of the donor base station that is broadcast by the donor base station, the permitted area code that is of the donor cell and that is broadcast by the donor base station, or positioning (for example, global navigation satellite system (GNSS)) information and a PCI of a relay cell through which the mobile relay device provides the relay function for the terminal device in the donor cell, the PCI of the relay cell through which the mobile relay device provides the relay function for the terminal device in the donor cell.

With reference to the first aspect, in some implementations of the first aspect, that the mobile relay device obtains a PCI of a relay cell through which the relay function is provided for a terminal device includes: The mobile relay device receives third information from the network device, where the third information indicates at least one PCI corresponding to the permitted area. The mobile relay device obtains, based on the at least one PCI corresponding to the permitted area and the first information, the PCI of the relay cell through which the relay function is provided for the terminal device.

Specifically, the third information may include the information indicating the permitted area, and the information about the permitted area includes information about the at least one (relay-type) PCI corresponding to the permitted area. In other words, there may be a mapping relationship between the information about the permitted area and the information about the at least one (relay-type) PCI corresponding to the information about the permitted area. In this way, the mobile relay device can obtain, based on the third information, that is, based on the mapping relationship between the permitted area and the at least one PCI corresponding to the permitted area, the information about the at least one (relay-type) PCI corresponding to the information about the permitted area, and then obtain, with reference to the first information (namely, at least one piece of information in the provider of the mobile relay device and the application layer service supported by the mobile relay device), the PCI of the relay cell through which the mobile relay device provides the relay function for the terminal device.

Based on the foregoing solution, the mobile relay device can obtain, based on the third information indicating the at least one PCI corresponding to the permitted area and the first information, the PCI of the relay cell through which the relay function is provided for the terminal device. In this way, the mobile relay device can provide the relay service for the terminal device served by the mobile relay device, so that the mobile relay device can accurately provide the relay service in the working area when the mobile relay device serves as the vehicle-mounted base station relay when the vehicle is in motion.

With reference to the first aspect, in some implementations of the first aspect, that the mobile relay device obtains a PCI of a relay cell through which the relay function is provided for a terminal device includes: The mobile relay device receives fourth information from the network device, where the fourth information indicates the PCI of the relay cell through which the mobile relay device provides the relay function for the terminal device.

Specifically, the fourth information indicates the PCI of the relay cell through which the mobile relay device provides the relay function for the terminal device, and is determined by the network device based on information about the permitted area specific to the mobile relay device that is configured for the donor base station in the permitted area and the first information (namely, at least one piece of information in the provider of the mobile relay device and the application layer service supported by the mobile relay device) that is reported by the mobile relay device. After receiving the fourth information, the mobile relay device may obtain, based on the fourth information, the PCI of the relay cell through which the mobile relay device provides the relay function for the terminal device.

Based on the foregoing solution, the mobile relay device can obtain, based on the fourth information indicating the PCI of the relay cell through which the mobile relay device provides the relay function for the terminal device, the PCI of the relay cell through which the relay function is provided for the terminal device. In this way, the mobile relay device can provide the relay service for the terminal device served by the mobile relay device, so that the mobile relay device can accurately provide the relay service in the working area when the mobile relay device serves as the vehicle-mounted base station relay when the vehicle is in motion.

With reference to the first aspect, in some implementations of the first aspect, the network device includes at least one of the donor base station, a core network device, or an operation, administration, and maintenance entity.

According to a second aspect, a method of sending information is provided, and includes: A network device learns that a mobile relay device has moved to a permitted area in which the mobile relay device is allowed to use a relay function, where the permitted area is a cell covered by a donor base station. The network device sends notification information to the mobile relay device, where the notification information indicates the mobile relay device to obtain a physical cell identifier of a relay cell through which the relay function is provided for a terminal device.

Based on the foregoing solution, the network device can enable the mobile relay device to obtain the physical cell identifier of the relay cell through which the relay function is provided for the terminal device. In this way, the mobile relay device can provide a relay service for the terminal device served by the mobile relay device, so that the mobile relay device can accurately provide the relay service in a working area when the mobile relay device serves as a vehicle-mounted base station relay when the vehicle is in motion.

With reference to the second aspect, in some implementations of the second aspect, the method further includes: The network device receives first information from the mobile relay device, where the first information indicates at least one of a provider of the mobile relay device and an application layer service supported by the mobile relay device.

With reference to the second aspect, in some implementations of the second aspect, the method further includes: The network device sends second information to the mobile relay device, where the second information indicates the permitted area.

With reference to the second aspect, in some implementations of the second aspect, the method further includes: The network device sends third information to the mobile relay device, where the third information indicates at least one PCI corresponding to the permitted area.

With reference to the second aspect, in some implementations of the second aspect, the method further includes: The network device determines fourth information, where the fourth information indicates a PCI of a relay cell through which the mobile relay device provides the relay function for the terminal device. The network device sends the fourth information to the mobile relay device.

Specifically, the network device may determine, based on information about the permitted area specific to the mobile relay device that is configured for the donor base station in the permitted area and the first information (namely, at least one piece of information in the provider of the mobile relay device and the application layer service supported by the mobile relay device) that is reported by the mobile relay device, the PCI of the relay cell through which the mobile relay device provides the relay function for the terminal device.

With reference to the second aspect, in some implementations of the second aspect, the network device includes at least one of the donor base station, a core network device, or an operation, administration, and maintenance entity.

According to a third aspect, an information obtaining apparatus is provided, and includes: a processing module, configured to move to a permitted area in which the apparatus is allowed to use a relay function, where the permitted area is a cell covered by a donor base station; and a communication module, configured to obtain, in the permitted area, a physical cell identifier of a relay cell through which the relay function is provided for a terminal device, where the relay cell is a cell accessed by the terminal device.

For beneficial effects brought by the foregoing solution, refer to the related descriptions of the first aspect. For brevity, details are not described herein again in this application.

With reference to the third aspect, in some implementations of the third aspect, the communication module is further configured to send first information to a network device, where the first information indicates at least one of a provider of a mobile relay device and an application layer service supported by the mobile relay device.

With reference to the third aspect, in some implementations of the third aspect, the communication module is further configured to receive second information from the network device, where the second information indicates the permitted area; and the processing module is further configured to obtain, based on the second information, the PCI of the relay cell through which the relay function is provided for the terminal device.

With reference to the third aspect, in some implementations of the third aspect, information about the permitted area is preconfigured when the mobile relay device is produced.

With reference to the third aspect, in some implementations of the third aspect, the communication module is further configured to receive third information from the network device, where the third information indicates at least one PCI corresponding to the permitted area; and the processing module is further configured to obtain, based on the at least one PCI corresponding to the permitted area and the first information, the PCI of the relay cell through which the relay function is provided for the terminal device.

For beneficial effects brought by the foregoing solution, refer to the related descriptions of the first aspect. For brevity, details are not described herein again in this application.

With reference to the third aspect, in some implementations of the third aspect, the communication module is further configured to receive fourth information from the network device, where the fourth information indicates the PCI of the relay cell through which the mobile relay device provides the relay function for the terminal device.

For beneficial effects brought by the foregoing solution, refer to the related descriptions of the first aspect. For brevity, details are not described herein again in this application.

With reference to the third aspect, in some implementations of the third aspect, the network device includes at least one of the donor base station, a core network device, or an operation, administration, and maintenance entity.

According to a fourth aspect, an information sending apparatus is provided, and includes: a processing module, configured to learn that a mobile relay device has moved to a permitted area in which the mobile relay device is allowed to use a relay function, where the permitted area is a cell covered by a donor base station; and a communication module, configured to send notification information to the mobile relay device, where the notification information indicates the mobile relay device to obtain a physical cell identifier of a relay cell through which the relay function is provided for a terminal device.

For beneficial effects brought by the foregoing solution, refer to the related descriptions of the second aspect. For brevity, details are not described herein again in this application.

With reference to the fourth aspect, in some implementations of the fourth aspect, the communication module is further configured to receive first information from the mobile relay device, where the first information indicates at least one of a provider of the mobile relay device and an application layer service supported by the mobile relay device.

With reference to the fourth aspect, in some implementations of the fourth aspect, the communication module is further configured to send second information to the mobile relay device, where the second information indicates the permitted area.

With reference to the fourth aspect, in some implementations of the fourth aspect, the communication module is further configured to send third information to the mobile relay device, where the third information indicates at least one PCI corresponding to the permitted area.

With reference to the fourth aspect, in some implementations of the fourth aspect, the processing module is further configured to determine fourth information, where the fourth information indicates a PCI of a relay cell through which the mobile relay device provides the relay function for the terminal device. The communication module is further configured to send the fourth information to the mobile relay device.

With reference to the fourth aspect, in some implementations of the fourth aspect, the information sending apparatus includes at least one of the donor base station, a core network device, or an operation, administration, and maintenance entity.

According to a fifth aspect, a communication apparatus is provided, and includes a processor and an interface circuit. The interface circuit is configured to: receive a signal from a communication apparatus other than the communication apparatus, and transmit the signal to the processor; or send a signal from the processor to a communication apparatus other than the communication apparatus. The processor is configured to implement, through a logic circuit or by executing code instructions, the method in any possible implementation of the first aspect.

According to a sixth aspect, a communication apparatus is provided, and includes a processor and an interface circuit. The interface circuit is configured to: receive a signal from a communication apparatus other than the communication apparatus, and transmit the signal to the processor; or send a signal from the processor to a communication apparatus other than the communication apparatus. The processor is configured to implement, through a logic circuit or by executing code instructions, the method in any possible implementation of the second aspect.

According to a seventh aspect, a computer-readable storage medium is provided. The computer-readable storage medium stores a computer program or instructions. When the computer program or the instructions are executed, the method in any possible implementation of the first aspect is implemented.

According to an eighth aspect, a computer-readable storage medium is provided. The computer-readable storage medium stores a computer program or instructions. When the computer program or the instructions are executed, the method in any possible implementation of the second aspect is implemented.

According to a ninth aspect, a computer program product including instructions is provided. When the instructions are run, the method in any possible implementation of the first aspect is implemented.

According to a tenth aspect, a computer program product including instructions is provided. When the instructions are run, the method in any possible implementation of the second aspect is implemented.

According to an eleventh aspect, a computer program is provided. The computer program includes code or instructions. When the code or the instructions are run, the method in any possible implementation of the first aspect is implemented.

According to a twelfth aspect, a computer program is provided. The computer program includes code or instructions. When the code or the instructions are run, the method in any possible implementation of the second aspect is implemented.

According to a thirteenth aspect, a chip system is provided. The chip system includes a processor, may further include a memory, and is configured to implement the method in any possible implementation of the first aspect. The chip system may include a chip, or may include the chip and another discrete component.

According to a fourteenth aspect, a chip system is provided. The chip system includes a processor, may further include a memory, and is configured to implement the method in any possible implementation of the second aspect. The chip system may include a chip, or may include the chip and another discrete component.

According to a fifteenth aspect, a communication system is provided. The communication system includes the apparatus according to the third aspect or the fourth aspect.

DESCRIPTION OF EMBODIMENTS

The following describes technical solutions in this application with reference to accompanying drawings.

The technical solutions in embodiments of this application may be applied to various communication systems, for example, a long term evolution (LTE) system, an LTE frequency division duplex (FDD) system, an LTE time division duplex (TDD) system, a 5th generation (5G) system, a new radio (NR) system, or the like.

The technical solutions in embodiments of this application may be further applied to device-to-device (D2D) communication, machine-to-machine (M2M) communication, machine type communication (MTC), and communication in an internet of vehicles system. Communication modes in the internet of vehicles system are collectively referred to as V2X (X represents everything). For example, V2X communication includes vehicle-to-vehicle (V2V) communication, vehicle-to-infrastructure (V2I) communication, vehicle-to-pedestrian (V2P) communication, or vehicle-to-network (V2N) communication.

For ease of understanding embodiments of this application, a network architecture applicable to embodiments of this application is first described with reference to FIG. 1.

Figures 1, 2:
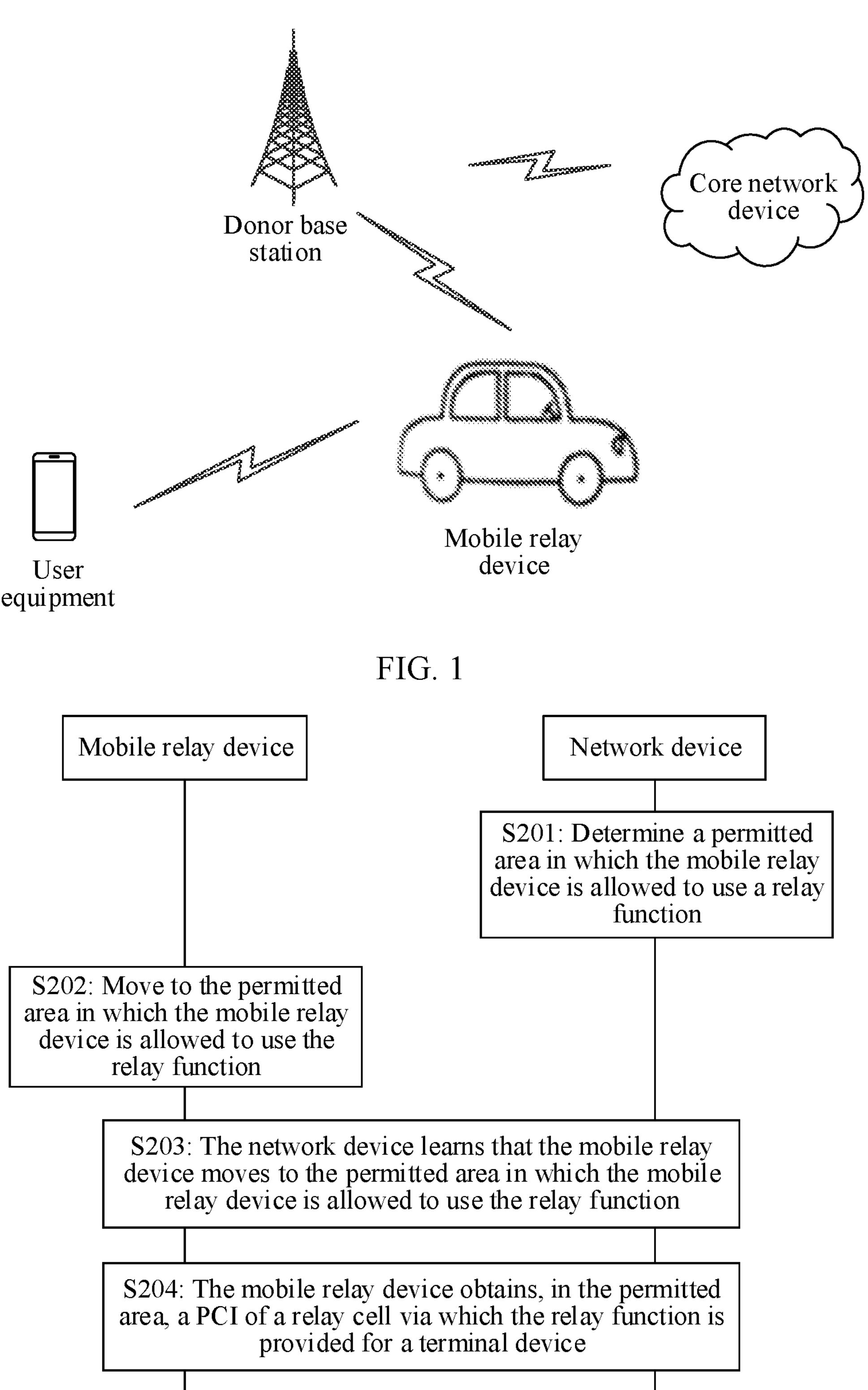
FIG. 1 is a schematic diagram of a network architecture applicable to an embodiment of this application.
FIG. 2 is a flowchart of a method of obtaining information according to an embodiment of this application.

FIG. 1 is a schematic diagram of a network architecture applicable to an embodiment of this application. As shown in FIG. 1, a mobile relay device communicates with a core network device through a donor base station, and provides a relay service for user equipment. Basic communication assumptions in FIG. 1 are as follows:

(1) The 5G NR standard is used for a radio link between the mobile relay device and the donor base station and a radio link between the mobile relay device and the user equipment.

(2) The mobile relay device is connected to the core network device (a 5GC) through a donor RAN node.

(3) A single-hop relay is a basic communication scenario (a multi-hop relay is optional).

It should be understood that FIG. 1 is merely an example for description, and this application is not limited thereto.

In addition, for ease of understanding embodiments of this application, the following several descriptions are provided.

First, the donor base station in the network architecture may be any device having a wireless transceiver function. The device includes but is not limited to an evolved NodeB (eNB), a baseband unit (BBU), or the like; may be a gNB or a transmission point (a TRP or a TP) in a 5G system such as an NR system, or an antenna panel or a group of antenna panels (including a plurality of antenna panels) of a base station in the 5G system; or may be a network node, for example, a baseband unit (BBU) or a distributed unit (DU), that constitutes a gNB or a transmission point.

In some deployments, the gNB may include a central unit (CU) and the DU. The gNB may further include an active antenna unit (AAU). The CU implements some functions of the gNB, and the DU implements some functions of the gNB. For example, the CU is responsible for processing a non-real-time protocol and service, to implement functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified as a network device in an access network (RAN), or the CU may be classified as a network device in a core network (CN). This is not limited in this application.

Second, the terminal device in the network architecture may also be referred to as the user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet (Pad), a computer having a wireless transceiver function, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. An application scenario is not limited in embodiments of this application.

Third, the mobile relay device in the network architecture may be wirelessly connected to a macro RAN node, namely, the donor base station, thereby being connected to a 5G network; and may provide 5G coverage and communication for nearby user equipment. For example, the mobile relay device may be a vehicle-mounted base station relay, namely, a small vehicle-mounted base station relay deployed on a mobile vehicle, and may provide 5G coverage and communication for user equipment in or near the vehicle.

In addition, for ease of understanding embodiments of this application, the following first briefly describes several terms in this application.

1. Permitted Area

Currently, the concept of the permitted area is proposed for a vehicle-mounted base station relay. In the permitted area, the vehicle-mounted base station relay is allowed to use a relay function. A specific service procedure is as follows:

(1) When an engine of a vehicle is started, a mobile base station relay registers with a 5G network to obtain configuration information (for example, an operating frequency band), and may provide 5G access for a terminal device after obtaining authorization.

(2) The vehicle enters the permitted area, and a mobile base station relay station can provide 5G access for a terminal device near the vehicle.

(3) After moving to the permitted area, user equipment A accesses the mobile base station relay.

(4) When the vehicle exits from the permitted area, the mobile base station relay cannot work, and the user equipment A is disconnected.

(5) When the vehicle enters another permitted area, the mobile base station relay works again, and user equipment B is connected.

(6) After the vehicle arrives at a destination, the engine is shut down, and the mobile base station relay automatically stops working.

2. Physical Cell Identifier

The physical cell identifier (PCI) is an important parameter of a 5G cell. Each NR cell corresponds to one PCI. The physical cell identifier is for distinguishing between different cells on a radio side, and affects downlink-signal synchronization, demodulation, and handover. Allocating an appropriate PCI to the 5G cell is significant for construction and maintenance of a 5G radio network. There are 1008 PCIs in total in 5G. These PCIs are divided into 336 groups, and each group includes three PCIs, as shown below:

$$N_{ID}^{cell} = 3N_{ID}^{(1)} + N_{ID}^{(2)}$$

$$N_{ID}^{(1)} = \{0 \sim 335\}, \text{ and } N_{ID}^{(2)} = \{0, 1, 2\}.$$

In addition, PCI planning mainly complies with the following principles:

(1) Avoidance of PCI collision and confusion (a) Collision-free principle: A same PCI cannot be allocated to neighboring cells. If the same PCI is allocated to the neighboring cells, a UE cannot detect the neighboring cells in an overlapped coverage area, and handover and camping are affected.

(b) Confusion-free principle: A same PCI cannot be allocated to a serving cell and a neighboring cell thereof that are on a same frequency. If the same PCI is allocated, when a terminal device reports the PCI of the neighboring cell to a base station to which a source cell belongs, the source base station cannot determine a target handover cell based on the PCI. If the terminal device does not support reporting of a cell global identifier (CGI), handover is not initiated.

(2) Improvement of network performance (a) A ZC sequence group number based on a 3rd generation partnership project (3GPP) physical uplink shared channel (PUSCH) demodulation reference signal (DMRS) is related to PCI mod 30. For a PUCCH DMRS and an SRS, PCI mod 30 is used as a higher-layer configuration ID for an algorithm to select a sequence group. Therefore, physical-layer cell identity (PCI) mod 30 of the neighboring cells should be staggered as much as possible, to ensure correct uplink-signal demodulation.

(b) Most interference randomization algorithms are all related to PCI mod 3. If PCI mod 3 of the neighboring cells is staggered as much as possible, gains of the algorithm can be ensured.

3. Relay Node

The relay node (RN), also referred to as a wireless relay station, may alternatively be an IAB node in an integrated access and backhaul (IAB) system, and is a wireless relay in a form of a small cell. Each RN has an upper-level base station, namely, a donor base station. A backhaul from the RN to the donor base station is implemented by using a radio link. There are two hops of radio links on the RN that respectively correspond to a Uu interface (an access link) oriented to a terminal device and a Un interface (a relay link) oriented to the donor base station.

4. Operation, Administration, and Maintenance

Operation, administration, and maintenance (OAM) refer to three categories: operation, administration, and maintenance into which network management work is usually classified based on an actual requirement of network operation of an operator. The operation mainly means completing routine analysis, prediction, planning, and configuration work performed on a network and a service, and the maintenance is mainly a routine operation activity such as testing and fault management performed on the network and the service thereof.

Usually, RN initialization is mainly divided into two phases:

(1) The RN accesses the network as the terminal device, establishes a connection to the OAM, obtains an initial configuration parameter (for example, list information of the donor base station, where a base station does not broadcast whether a relay capability is supported, and the RN needs to access the network to obtain information about a base station supporting the relay capability), and then is separated.

(2) The RN accesses the network as an RN, obtains an operation parameter of the RN from the OAM, and then establishes and configures the Un interface.

However, in the foregoing process, mobility of the RN is not involved. A PCI of the RN is fixed, and is not applicable to a scenario of a mobile relay.

In view of this, this application proposes a method of obtaining information for a scenario in which a relay is in motion. A procedure of delivering information about the permitted area and corresponding information is designed, to alleviate a problem of switch control of the mobile relay in the permitted area, and alleviate a problem that service continuity of UE served by the mobile relay is poor when the mobile relay moves out of the permitted area, and improves a capability to better provide a relay service for the UE.

It should be understood that, in the following embodiments of this application, a mobile relay device may be a vehicle-mounted terminal device, a vehicle-mounted base station relay device, or a device similar to a base station. This is not limited herein in this application.

FIG. 2 is a flowchart of a method of obtaining information 200 according to an embodiment of this application. As shown in FIG. 2, the method 200 includes the following steps.

S201: A network device determines a permitted area in which a mobile relay device is allowed to use a relay function.

For example, the network device may determine the permitted area in which the mobile relay device is allowed to use the relay function, where the permitted area is a cell covered by a donor base station. The relay function may enable base stations or users not to directly send signals to each other but to forward the signals through the relay device after signal-amplification processing, to achieve an effect of expanding network coverage.

S202: The mobile relay device moves to the permitted area in which the mobile relay device is allowed to use the relay function.

For example, the mobile relay device may move to the permitted area.

In a possible implementation, the mobile relay device may receive second information sent by the network device, where the second information indicates the permitted area. Therefore, the mobile relay device may obtain information about the permitted area based on the second information, and move to the permitted area. There is a mapping relationship between the information about the permitted area and information about a PCI of a relay cell through which the mobile relay device provides the relay function for a terminal device. Further, the second information is information sent by the network device in a broadcast form.

Specifically, the information about the permitted area may be obtained by the mobile relay device in any of the following forms:

1. an identifier of a donor cell that is broadcast by the donor base station;
2. an identifier of the donor base station that is broadcast by the donor base station;
3. a tracking area code of a donor cell that is broadcast by the donor base station;
4. a radio access network area code of a donor cell that is broadcast by the donor base station;
5. a PCI of a donor cell that is broadcast by the donor base station, or a primary synchronization signal/secondary synchronization signal (PSS/SSS) of the donor cell;
6. a permitted area code of the donor base station that is broadcast by the donor base station; or
7. a permitted area code of a donor cell that is broadcast by the donor base station.

It should be understood that the information about the permitted area may be obtained by receiving, in a process of performing network registration by the mobile relay device, a non-access stratum (NAS) message sent by a core network device through an access and mobility management function (AMF) entity, or may be directly obtained when the mobile relay device establishes a connection to an OAM entity. This is not limited herein in this application.

It should be further understood that, when receiving the information about the permitted area, the mobile relay device may also obtain, from the core network device or the OAM entity, basic configuration information that corresponds when the mobile relay device works as a mobile relay, for example, configuration information such as an operation frequency band and a system frame number.

Optionally, before the mobile relay device obtains the second information, the mobile relay device may send first information to the network device, where the first information indicates at least one of a provider of the mobile relay device and an application layer service supported by the mobile relay device. The provider of the mobile relay device may include an internet service provider (ISP) to which the mobile relay device belongs. For example, the mobile relay device may be deployed in a bus, a taxi, or online car-hailing, and leased to different network companies to provide a service; or may be deployed by an operator to provide an access enhancement service. The application layer service supported by the mobile relay device includes supported application (App) information. For example, some mobile relay devices each provide a connection service only for a specific application, and a terminal device that subscribes to a related service may access the corresponding mobile relay devices.

In another possible implementation, information about the permitted area is preconfigured by the mobile relay device, and the mobile relay device may move to the permitted area based on the information about the permitted area. There is a mapping relationship between the permitted area and a PCI of a relay cell through which the mobile relay device provides the relay function for a terminal device.

S203: The network device learns that the mobile relay device has moved to the permitted area in which the mobile relay device is allowed to use the relay function.

For example, the network device may learn that the mobile relay device has moved to the permitted area in which the mobile relay device is allowed to use the relay function, so that a related operation that enables the mobile relay device to obtain the PCI of the relay cell through which the relay function is provided for the terminal device can be performed. For example, the network device may broadcast information indicating the PCI of the relay cell through which the mobile relay device provides the relay function for the terminal device, or broadcast information that has a mapping relationship with the PCI of the relay cell through which the mobile relay device provides the relay function for the terminal device.

S204: The mobile relay device obtains, in the permitted area, the PCI of the relay cell through which the relay function is provided for the terminal device.

For example, the mobile relay device may obtain, in the permitted area, the PCI of the relay cell through which the relay function is provided for the terminal device, thereby providing the relay function for the terminal device.

In a possible implementation, the mobile relay device may obtain, based on the second information, the PCI of the relay cell through which the relay function is provided for the terminal device.

Specifically, the mobile relay device may determine, based on the second information, namely, a mapping relationship between the permitted area and a PCI of a relay cell through which the mobile relay device provides the relay function for the terminal device in the donor cell, the PCI of the relay cell through which the relay function is provided for the terminal device in the donor cell.

For example, the mobile relay device may determine, based on a mapping relationship between the identifier of the donor cell that is broadcast by the donor base station and the PCI of the relay cell through which the mobile relay device provides the relay function for the terminal device in the donor cell, the PCI of the relay cell through which the relay function is provided for the terminal device in the donor cell.

For example, the mobile relay device may determine, based on a mapping relationship between the identifier of the donor base station that is broadcast by the donor base station and the PCI of the relay cell through which the mobile relay device provides the relay function for the terminal device in the donor cell, a PCI of a relay cell through which the relay function is provided for the terminal device and that corresponds to the donor base station.

For example, the mobile relay device may determine, based on a mapping relationship between the tracking area code that is of the donor cell and that is broadcast by the donor base station and the PCI of the relay cell through which the mobile relay device provides the relay function for the terminal device in the donor cell, a PCI of a relay cell through which the relay function is provided for the terminal device in a corresponding tracking area.

For example, the mobile relay device may determine, based on a mapping relationship between the radio access network area code broadcast by the donor base station and the PCI of the relay cell through which the mobile relay device provides the relay function for the terminal device in the donor cell, a PCI of a relay cell through which the relay function is provided for the terminal device in a corresponding radio access network area.

For example, the mobile relay device may determine, based on a mapping relationship between the PCI that is of the donor cell and that is broadcast by the donor base station and the PCI of the relay cell through which the mobile relay device provides the relay function for the terminal device in the donor cell, or based on the primary synchronization signal/the secondary synchronization signal of the donor cell, the PCI of the relay cell through which the relay function is provided for the terminal device.

For example, the mobile relay device may determine, based on a mapping relationship between the permitted area code of the donor base station that is broadcast by the donor base station and the PCI of the relay cell through which the mobile relay device provides the relay function for the terminal device in the donor cell, a PCI of a relay cell through which the relay function is provided for the terminal device and that corresponds to the donor base station.

For example, the mobile relay device may determine, based on a mapping relationship between the permitted area code that is of the donor cell and that is broadcast by the donor base station and the PCI of the relay cell through which the mobile relay device provides the relay function for the terminal device in the donor cell, the PCI of the relay cell through which the relay function is provided for the terminal device in the donor cell.

For example, the mobile relay device may determine, based on positioning (for example, global navigation satellite system (GNSS)) information, a PCI of a relay cell through which the mobile relay device provides the relay function for the terminal device at a corresponding position obtained based on the GNSS information.

It should be understood that the mobile relay device may determine, based on a PCI of a current cell, the identifier of the donor cell that is broadcast by the donor base station, the identifier of the donor base station that is broadcast by the donor base station, the tracking area code of the donor cell that is broadcast by the donor base station, the tracking area code of the donor cell that is broadcast by the donor base station, the radio access network area code of the donor cell that is broadcast by the donor base station, the permitted area code of the donor base station that is broadcast by the donor base station, or the permitted area code of the donor cell that is broadcast by the donor base station, or based on the information about the permitted area, whether the current cell supports the relay function. If information is matched, the mobile relay device may initiate access in the current cell (namely, the relay cell), and may provide a relay service after accessing a network.

In another possible implementation, the mobile relay device obtains, by receiving third information from the network device, the PCI of the relay cell through which the relay function is provided for the terminal device. The third information indicates at least one PCI corresponding to the permitted area. Further, the third information is information sent by the network device in a broadcast form.

Specifically, the third information may include the information indicating the permitted area, and the information about the permitted area includes information about the at least one (relay-type) PCI corresponding to the permitted area. In other words, there may be a mapping relationship between the information about the permitted area and the information about the at least one (relay-type) PCI corresponding to the information about the permitted area. In this way, the mobile relay device can obtain, based on the third information, that is, based on the mapping relationship between the permitted area and the at least one PCI corresponding to the permitted area, the information about the at least one (relay-type) PCI corresponding to the information about the permitted area, and then obtain, with reference to the first information (namely, at least one piece of information in the provider of the mobile relay device and the application layer service supported by the mobile relay device), the PCI of the relay cell through which the mobile relay device provides the relay function for the terminal device.

The third information is the information about the permitted area specific to the mobile relay device that is configured by the network device for the donor base station in the permitted area.

In another possible implementation, the mobile relay device obtains, by receiving fourth information from the network device, the PCI of the relay cell through which the relay function is provided for the terminal device. The fourth information indicates the PCI of the relay cell through which the mobile relay device provides the relay function for the terminal device. Further, the fourth information is information sent by the network device in a broadcast form.

Specifically, after receiving the first information from the mobile relay device, the network device allocates, to the mobile relay device with reference to the first information (namely, at least one piece of information in the provider of the mobile relay device and the application layer service supported by the mobile relay device) and the information about the permitted area specific to the mobile relay device that is configured for the donor base station in the permitted area, the PCI of the relay cell through which the relay function is provided for the terminal device. Then, the mobile relay device obtains, by receiving the fourth information indicating the PCI of the relay cell through which the relay function is provided for the terminal device, the PCI of the relay cell through which the relay function is provided for the terminal device.

It should be understood that, in the foregoing solution, the network device may include at least one of the donor base station, the core network device, or the operation, administration, and maintenance entity.

Based on the foregoing solution, the mobile relay device can obtain the information about the permitted area from the network device, and further report relay capability information (namely, the first information). In addition, the possible forms of the information about the permitted area are described. Finally, the mobile relay device can determine, based on the information about the permitted area, the second information, the third information, or the fourth information from the network device, the PCI of the relay cell through which the relay function is provided for the terminal device. In this way, the mobile relay device can provide the relay service for the terminal device served by the mobile relay device, so that the mobile relay device can accurately provide the relay service in a working area when the mobile relay device serves as a vehicle-mounted base station relay when the vehicle is in motion.

Figure 3:
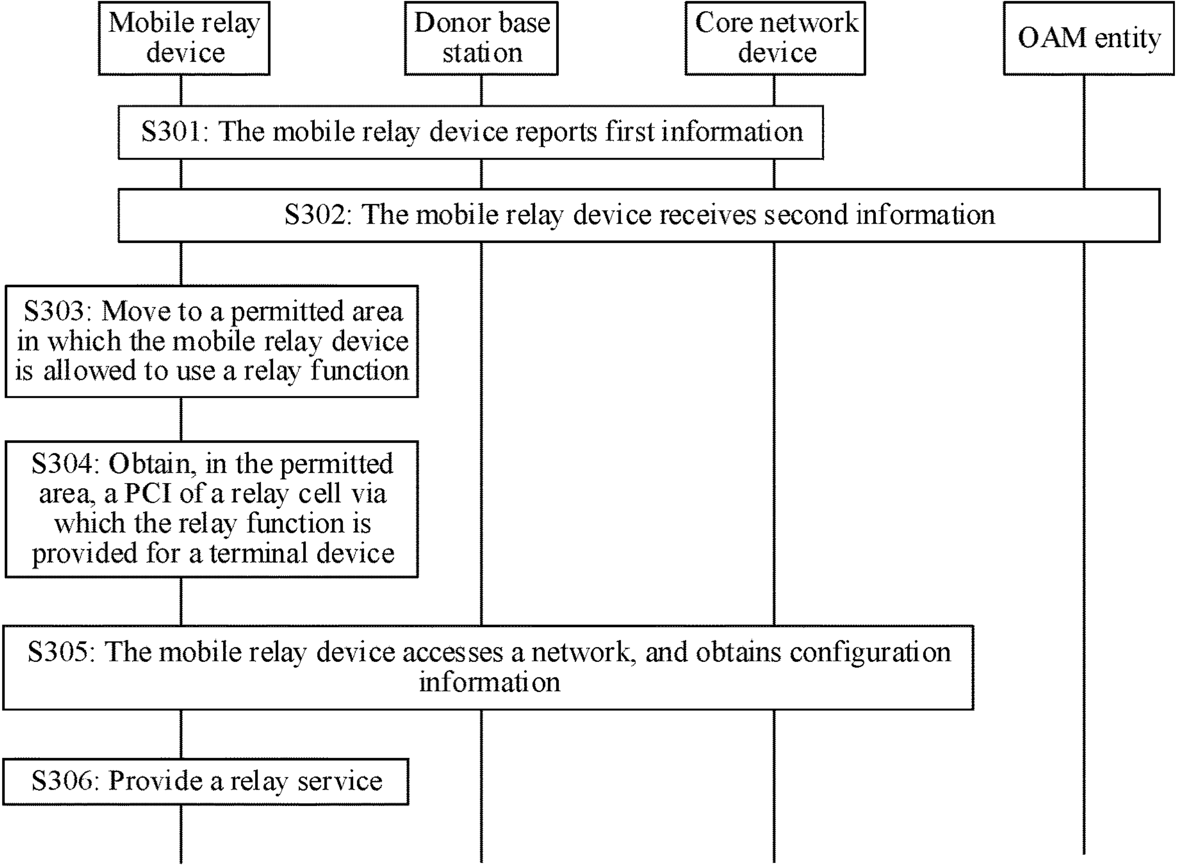
FIG. 3 is a flowchart of a method of obtaining information according to an embodiment of this application.

FIG. 3 is a flowchart of a method of obtaining information 300 according to an embodiment of this application. As shown in FIG. 3, the method 300 includes the following steps.

S301: A mobile relay device reports first information.

For example, the mobile relay device may report the first information, where the first information indicates at least one of a provider of the mobile relay device and an application layer service supported by the mobile relay device. In addition, the mobile relay device may alternatively report the first information in a process of completing initial registration with a network, and attach to a core network device. For example, the mobile relay device may attach the first information to registration request information, so that the mobile relay device reports the first information when sending the registration request information to the core network device. The provider of the mobile relay device may include an internet service provider (ISP) to which the mobile relay device belongs. For example, the mobile relay device may be deployed in a bus, a taxi, or online car-hailing, and leased to different network companies to provide a service; or may be deployed by an operator to provide an access enhancement service. The application layer service supported by the mobile relay device includes supported application (App) information. For example, some mobile relay devices each provide a connection service only for a specific application, and a terminal device that subscribes to a related service may access the corresponding mobile relay devices. In addition, in the process of the initial registration with the network, the mobile relay device may establish a connection to a base station, send the registration request information, and establish a user context on the core network device after obtaining authorization, to perform connection management and session management.

It should be understood that the mobile relay device may report the first information to the core network device through a radio access network (RAN) device, or may directly report the first information to the core network device by using non-access stratum (NAS) signaling. This is not limited herein in this application.

S302: The mobile relay device receives second information.

For example, the mobile relay device may receive the second information. The second information indicates a permitted area. The permitted area is a cell covered by a donor base station. In the permitted area, the mobile relay device can be allowed to use a relay function.

Specifically, for descriptions of the second information and information about the permitted area, refer to the descriptions related to the second information and the information about the permitted area in S202. For brevity, details are not described herein again in this application.

It should be understood that the mobile relay device may alternatively receive the second information from the core network device in the process of the initial registration. For example, the mobile relay device may receive registration accept information from the core network device, where the registration accept information includes the second information, so that the mobile relay device can obtain the second information (for example, the core network device sends the second information to the mobile relay device through an access and mobility management function (AMF) entity by using NAS signaling). In addition, the mobile relay device may alternatively establish a connection to an OAM entity, and directly receive the second information from the OAM entity. This is not limited herein in this application.

It should be further understood that, when receiving the information about the permitted area, the mobile relay device may also obtain, from the core network device or the OAM entity, basic configuration information that corresponds when the mobile relay device works as a mobile relay, for example, configuration information such as an operation frequency band and a system frame number.

S303: The mobile relay device moves to the permitted area in which the mobile relay device is allowed to use the relay function.

For example, the mobile relay device may move, based on the information about the permitted area, to the permitted area in which the mobile relay device is allowed to use the relay function.

In a possible implementation, the mobile relay device may obtain the information about the permitted area by receiving the second information indicating the permitted area, and move to the permitted area.

In another possible implementation, the information about the permitted area is preconfigured by the mobile relay device, and the mobile relay device may move to the permitted area based on the information about the permitted area.

S304: The mobile relay device obtains, in the permitted area, a PCI of a relay cell through which the relay function is provided for a terminal device.

For example, the mobile relay device may obtain, in the permitted area, the PCI of the relay cell through which the relay function is provided for the terminal device, thereby providing the relay function for the terminal device.

Specifically, the mobile relay device may obtain, based on the second information, the PCI of the relay cell through which the relay function is provided for the terminal device. For descriptions in which the mobile relay device obtains, based on the second information, the PCI of the relay cell through which the relay function is provided for the terminal device, refer to the related descriptions in which the mobile relay device obtains, based on the second information, the PCI of the relay cell through which the relay function is provided for the terminal device in S204. For brevity, details are not described herein in this application.

It should be understood that the mobile relay device may determine, based on a PCI of a current cell or an identifier of a donor cell that is broadcast by the donor base station/an identifier of the donor base station that is broadcast by the donor base station/a tracking area code of a donor cell that is broadcast by the donor base station/a tracking area code of a donor cell that is broadcast by the donor base station/a radio access network area code of a donor cell that is broadcast by the donor base station/a permitted area code of the donor base station that is broadcast by the donor base station/a permitted area code of a donor cell that is broadcast by the donor base station, or based on the information about the permitted area, whether the current cell supports the relay function. If information is matched, the mobile relay device may initiate access in the current cell (namely, the relay cell), and may provide a relay service after accessing the network.

S305: The mobile relay device accesses the network, and obtains configuration information.

For example, the mobile relay device accesses the network, and obtains the configuration information from the donor base station. The configuration information may be different from the basic configuration information in step S302 (that is, a configuration is updated), and latest configuration information is used. In addition, re-authentication may be performed on the mobile relay device to determine that the mobile relay device may provide the relay service in a current area.

S306: The mobile relay device provides the relay service.

For example, after accessing the network and obtaining the configuration information, the mobile relay device may start to work as the mobile relay, to provide the relay service.

Based on the foregoing solution, the mobile relay device can report relay capability information (namely, the first information), and obtain the second information from a network device. Finally, the mobile relay device can determine, based on the second information from the donor base station, the PCI of the relay cell through which the relay function is provided for the terminal device. In this way, the mobile relay device can provide the relay service for the terminal device served by the mobile relay device, so that the mobile relay device can accurately provide the relay service in a working area when the mobile relay device serves as a vehicle-mounted base station relay when the vehicle is in motion.

Figure 4:
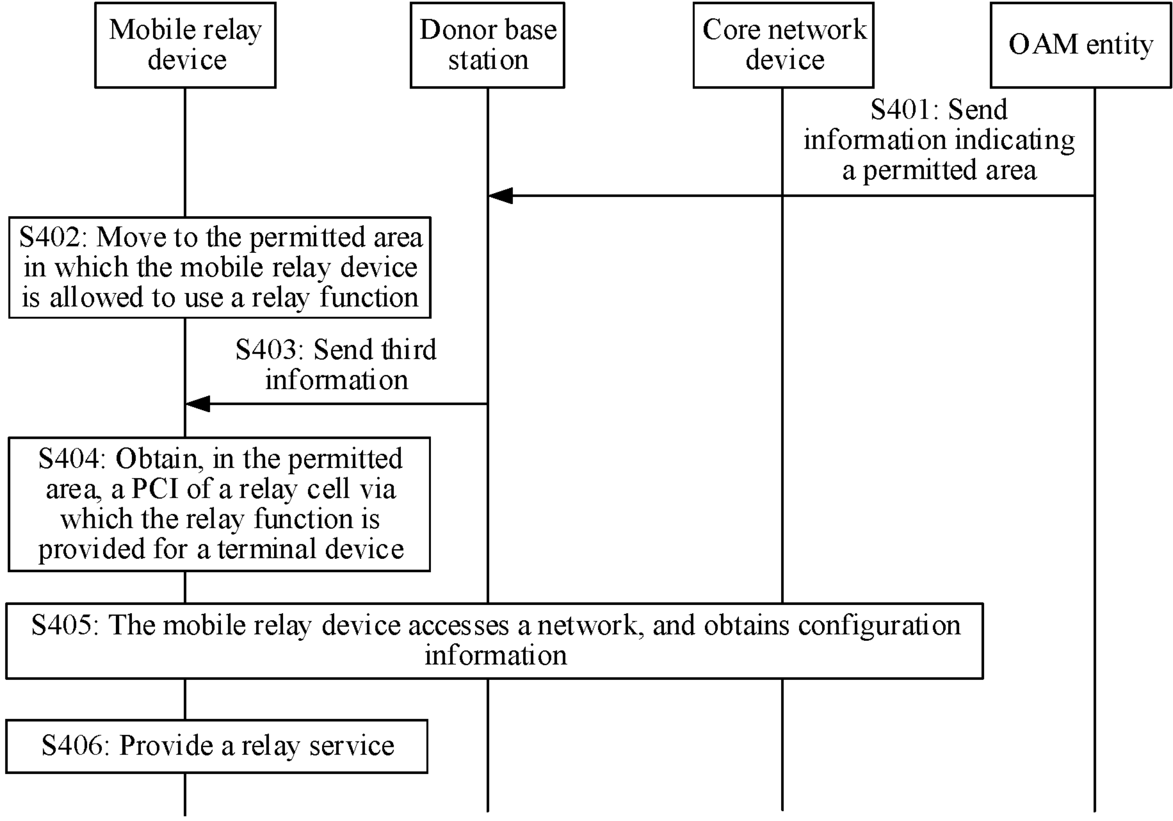
FIG. 4 is a flowchart of a method of obtaining information according to an embodiment of this application.

FIG. 4 is a flowchart of a method of obtaining information 400 according to an embodiment of this application. As shown in FIG. 4, the method 400 includes the following steps.

S401: An OAM entity sends, to a donor base station, information indicating a permitted area. Accordingly, the donor base station receives, from the OAM entity, the information indicating the permitted area.

For example, the OAM entity may configure the information about the permitted area specific to a mobile relay device for the donor base station in the permitted area. There may be a mapping relationship between the permitted area and at least one (relay-type) PCI corresponding to the permitted area. That is, third information may indicate information about the at least one (relay-type) PCI corresponding to the permitted area. In addition, the OAM entity may indicate the donor base station to broadcast the information indicating the permitted area.

Specifically, for the mapping relationship between the permitted area and the at least one (relay-type) PCI corresponding to the permitted area, refer to the mapping relationship between the permitted area and the PCI of the relay cell through which the mobile relay device provides the relay function for the terminal device in the donor cell in S204. For brevity, details are not described herein again in this application.

S402: The mobile relay device moves to the permitted area in which the mobile relay device is allowed to use a relay function.

For example, the mobile relay device may move to the permitted area in which the mobile relay device is allowed to use the relay function. The permitted area is a cell covered by the donor base station. In the permitted area, the mobile relay device can be allowed to use the relay function.

S403: The donor base station sends the third information to the mobile relay device. Accordingly, the mobile relay device receives the third information from the donor base station.

For example, the mobile relay device may receive the third information from the donor base station, where the third information indicates the at least one (relay-type) PCI corresponding to the permitted area. Further, the donor base station may send the third information in a broadcast form.

Specifically, the mobile relay device may obtain, by receiving the third information from the donor base station, the at least one (relay-type) PCI corresponding to the permitted area. For descriptions of the third information, refer to the descriptions related to the third information in S204. For brevity, details are not described herein in this application.

S404: The mobile relay device obtains, in the permitted area, a PCI of a relay cell through which the relay function is provided for a terminal device.

For example, the mobile relay device may obtain, in the permitted area based on the third information from the donor base station, the PCI of the relay cell through which the relay function is provided for the terminal device.

Specifically, the mobile relay device can obtain, based on the third information, that is, based on the mapping relationship between the permitted area and the at least one PCI corresponding to the permitted area, the information about the at least one (relay-type) PCI corresponding to the information about the permitted area, and then obtain, with reference to first information (namely, at least one piece of information in a provider of the mobile relay device and an application layer service supported by the mobile relay device), the PCI of the relay cell through which the mobile relay device provides the relay function for the terminal device.

S405: The mobile relay device accesses a network, and obtains configuration information.

For example, the mobile relay device may access the network, and obtain the configuration information from the donor base station. In addition, re-authentication may be performed on the mobile relay device to determine that the mobile relay device may provide a relay service in a current area.

S406: The mobile relay device provides the relay service.

For example, after accessing the network and obtaining the configuration information, the mobile relay device may start to work as a mobile relay, to provide the relay service.

Based on the foregoing solution, the OAM entity pre-configures the information (namely, the information indicating the at least one (relay-type) PCI corresponding to the permitted area) about the permitted area specific to the mobile relay device for the donor base station in the permitted area. The donor base station receives the information, and sends, to the mobile relay device, the third information indicating the information about the at least one (relay-type) PCI corresponding to the permitted area. Finally, the mobile relay device can determine, based on the third information from the donor base station in combination with a relay type of the mobile relay device, the PCI of the relay cell through which the relay function is provided for the terminal device. In this way, the mobile relay device can provide the relay service for the terminal device served by the mobile relay device, so that the mobile relay device can accurately provide the relay service in a working area when the mobile relay device serves as a vehicle-mounted base station relay when the vehicle is in motion.

Figures 5, 6:
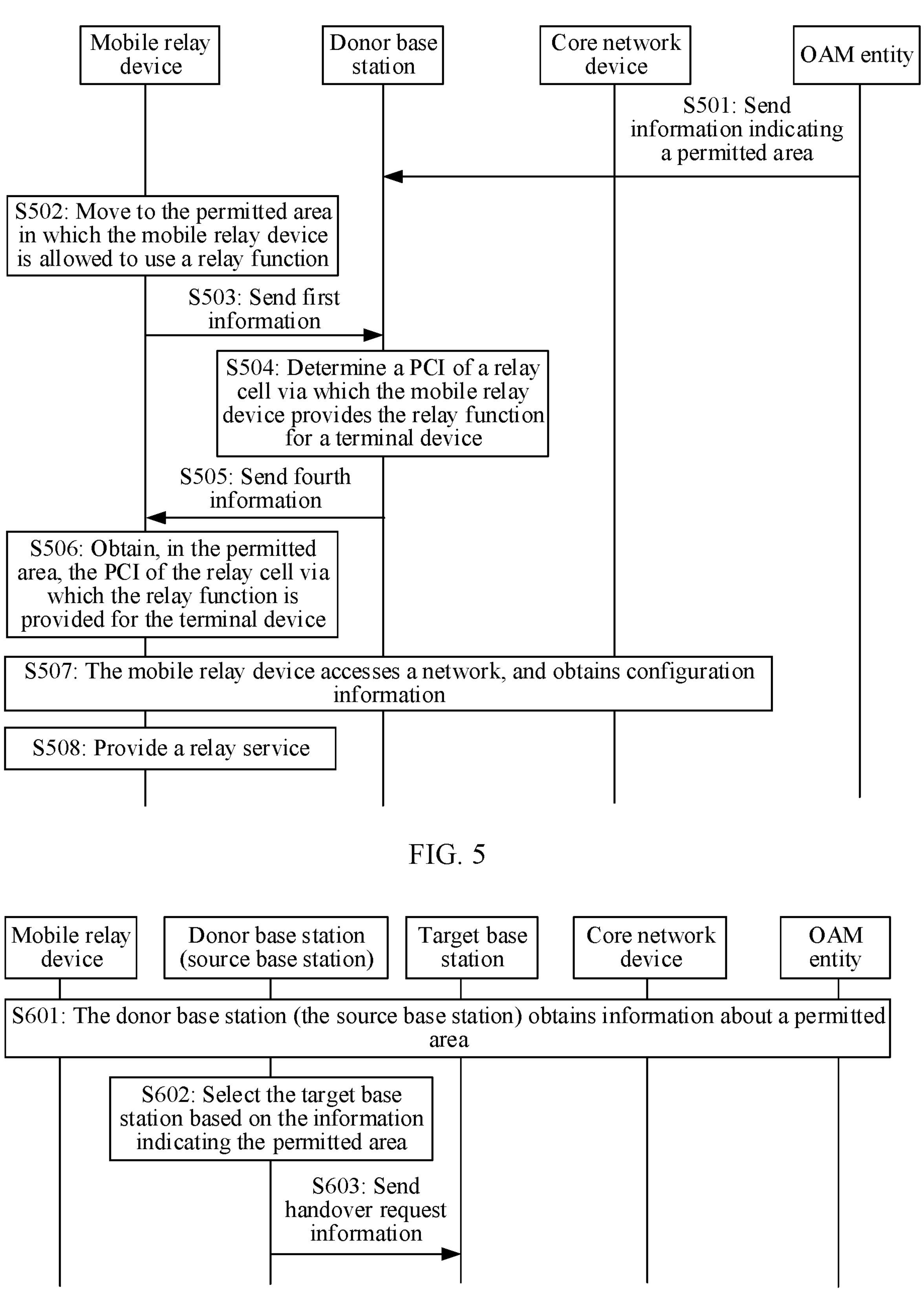
FIG. 5 is a flowchart of a method of obtaining information according to an embodiment of this application.
FIG. 6 is a flowchart of a base-station switching method according to an embodiment of this application.

FIG. 5 is a flowchart of a method of obtaining information 500 according to an embodiment of this application. As shown in FIG. 5, the method 500 includes the following steps.

S501: An OAM entity sends, to a donor base station, information indicating a permitted area. Accordingly, the donor base station receives, from the OAM entity, the information indicating the permitted area.

For example, the OAM entity may configure the information about the permitted area specific to a mobile relay device for the donor base station in the permitted area. For related descriptions of the information about the permitted area, refer to the related descriptions of the information about the permitted area in S202. For brevity, details are not described herein in this application.

S502: The mobile relay device moves to the permitted area in which the mobile relay device is allowed to use a relay function.

For example, the mobile relay device may move to the permitted area in which the mobile relay device is allowed to use the relay function. The permitted area is a cell covered by the donor base station. In the permitted area, the mobile relay device can be allowed to use the relay function.

S503: The mobile relay device sends first information to the donor base station. Accordingly, the donor base station receives the first information from the mobile relay device.

For example, the mobile relay device may send the first information to the donor base station, where the first information indicates at least one of a provider of the mobile relay device and an application layer service supported by the mobile relay device.

The provider of the mobile relay device may include an internet service provider (ISP) to which the mobile relay device belongs. For example, the mobile relay device may be deployed in a bus, a taxi, or online car-hailing, and leased to different network companies to provide a service; or may be deployed by an operator to provide an access enhancement service. The application layer service supported by the mobile relay device includes supported application (App) information. For example, some mobile relay devices each provide a connection service only for a specific application, and a terminal device that subscribes to a related service may access the corresponding mobile relay devices.

S504: The donor base station determines a PCI of a relay cell through which the mobile relay device provides the relay function for a terminal device.

For example, the donor base station may determine, based on the information that is about the permitted area and that is from the OAM entity and the first information from the mobile relay device, the PCI of the relay cell through which the mobile relay device provides the relay function for the terminal device.

S505: The donor base station sends fourth information to the mobile relay device. Accordingly, the mobile relay device receives the fourth information from the donor base station.

For example, after determining the PCI of the relay cell through which the mobile relay device provides the relay function for the terminal device, the donor base station may send the fourth information to the mobile relay device, where the fourth information indicates the PCI of the relay cell through which the mobile relay device provides the relay function for the terminal device. Further, the fourth information is information sent by a network device in a broadcast form.

S506: The mobile relay device obtains, in the permitted area, the PCI of the relay cell through which the relay function is provided for the terminal device.

For example, in the permitted area, the mobile relay device may obtain, based on the fourth information from the donor base station, the PCI of the relay cell through which the relay function is provided for the terminal device.

S507: The mobile relay device accesses a network, and obtains configuration information.

For example, the mobile relay device may access the network, and obtain the configuration information from the donor base station. In addition, re-authentication may be performed on the mobile relay device to determine that the mobile relay device may provide a relay service in a current area.

S508: The mobile relay device provides the relay service.

For example, after accessing the network and obtaining the configuration information, the mobile relay device may start to work as a mobile relay, to provide the relay service.

Based on the foregoing solution, the OAM configures the information about the permitted area specific to the mobile relay device for the donor base station in the permitted area, and sends the information to the donor base station. The donor base station determines, based on the information received from the OAM entity and relay capability information (namely, the first information) from the mobile relay device, the PCI of the relay cell through which the mobile relay device provides the relay function for the terminal device, and sends, to the mobile relay device, the fourth information indicating the PCI of the relay cell through which the mobile relay device provides the relay function for the terminal device. Finally, the mobile relay device can determine, based on the fourth information from the donor base station, the PCI of the relay cell through which the relay function is provided for the terminal device. In this way, the mobile relay device can provide the relay service for the terminal device served by the mobile relay device, so that the mobile relay device can accurately provide the relay service in a working area when the mobile relay device serves as a vehicle-mounted base station relay when the vehicle is in motion.

FIG. 6 is a flowchart of a base-station switching method 600 according to an embodiment of this application. As shown in FIG. 6, the method 600 includes the following steps.

S601: A donor base station (a source base station) obtains information indicating a permitted area.

For example, the donor base station (the source base station) may obtain the information indicating the permitted area of a mobile relay device.

The donor base station (the source base station) may obtain, through the mobile relay device, the information indicating the permitted area of the mobile relay device, obtain, through an OAM entity, the information indicating the permitted area of the mobile relay device, or obtain, through a core network device, the information indicating the permitted area of the mobile relay device. This is not limited herein in this application. For descriptions of the information about the permitted area of the mobile relay device, refer to the related descriptions of the information about the permitted area in S202. For brevity, details are not described herein again in this application.

S602: The donor base station (the source base station) selects a target base station based on the information indicating the permitted area.

For example, the donor base station (the source base station) may select the appropriate target base station for the mobile relay device based on the information indicating the permitted area of the mobile relay device.

S603: The donor base station (the source base station) sends handover request information to the target base station. Accordingly, the target base station receives the handover request message from the donor base station (the source base station).

For example, after the donor base station (the source base station) selects the target base station, the donor base station (the source base station) may send the handover request message to the target base station, to request the mobile relay device to be handed over from the donor base station (the source base station) to the target base station. Further, the handover request message may include the information about the permitted area, to be used as reference information for next time of base-station switching of the mobile relay device.

It should be understood that, in a base-station switching process of the mobile relay device, the donor base station (the source base station) may be caused to change. Therefore, based on the form of the information about the permitted area in S202, it can be learned that the change of the donor base station (the source base station) may cause a change of a PCI of a relay cell through which the mobile relay device provides a relay function for a terminal device. In this case, the mobile relay device needs to notify the terminal device served by the mobile relay device to update the PCI, to satisfy a subsequent communication requirement. Notification methods may include the following methods:

(1) The mobile relay device may notify, by using a paging message, the served terminal device that a system message is updated, and the terminal device may obtain an updated PCI by obtaining a broadcast message.

(2) The mobile relay device may notify, by using radio resource control (RRC) signaling, the terminal device served by the mobile relay device of an updated PCI.

Based on the foregoing solution, the donor base station (the source base station) preferentially selects a base station in the permitted area as the target base station by using the obtained information about the permitted area of the mobile relay device, so that the mobile relay device can always serve as a relay as much as possible to provide a network connection or a relay service for the terminal device served by the mobile relay device, thereby ensuring service continuity of the terminal device.

In addition, the foregoing information exchange manner can alleviate a problem of ensuring the service continuity of the terminal device served by the mobile relay device in a movement process of the mobile relay device. The core network device may further configure a mobility restriction list for the mobile relay device based on the information about the permitted area of the mobile relay device, to enable the donor base station to preferentially select the base station in the permitted area as the target base station, so that the mobile relay device can always serve as the relay as much as possible to provide the network connection or the relay service for the terminal device served by the mobile relay device. This also alleviates the problem of ensuring the service continuity of the terminal device served by the mobile relay device in the movement process of the mobile relay device. As shown below, Table 1 shows a mobility restriction list configured for the mobile relay device based on the information about the permitted area of the mobile relay device.

TABLE 1

| Forbidden area information | | 0 . . . <maxnoofPLMNs> | | This IE contains forbidden area information specified in TS 23.501 |
|---|---|---|---|---|
| PLMN identity | M | | 9.2.2.4 | |
| Forbidden tracking area code | | 1 . . . <maxnoofForbiddenTACs> | | |
| Tracking area code | M | | 9.2.2.5 | Tracking area code of a forbidden tracking area identifier |
| Service area information | | 0 . . . <maxnoofPLMNs> | | This IE contains service area information specified in TS 23.501 |

TABLE 1-continued

| Forbidden area information | | 0 . . . <maxnoofPLMNs> | | This IE contains forbidden area information specified in TS 23.501 |
| --- | --- | --- | --- | --- |
| PLMN identity | M | | 9.2.2.4 | |
| Allowed tracking area code | | 0 . . . <maxnooAllowedAreas> | | |
| Tracking area code | M | | 9.2.2.5 | Tracking area code of an allowed tracking area identifier |
| Unallowed tracking area code | | 0 . . . <maxnooAllowedAreas> | | |
| Tracking area code | M | | 9.2.2.5 | Tracking area code of an unallowed tracking area identifier |

As shown in Table 1, the mobility restriction list currently includes the forbidden-area information and the service area information. In a forbidden area or an unallowed service area, the terminal device is not allowed to initiate any communication or service request to a corresponding public land mobile network (PLMN). In a switching process, the source base station (namely, the donor base station) may select the appropriate target base station for the terminal device based on the mobility restriction list.

To ensure the service continuity of the terminal device served by the mobile relay device, when formulating the mobility restriction list of the mobile relay device, the core network device may list a common area outside a boundary of the permitted area as an unallowed tracking area code in the forbidden-area information or the service area information. In this way, when the mobile relay device is handed over at the boundary of the permitted area, the source base station (namely, the donor base station) can preferentially select the base station in the permitted area as the target base station, so that the mobile relay device can always serve as a mobile relay to provide the network connection or the relay service for the terminal device served by the mobile relay device, thereby ensuring the service continuity of the terminal device.

Figure 7:
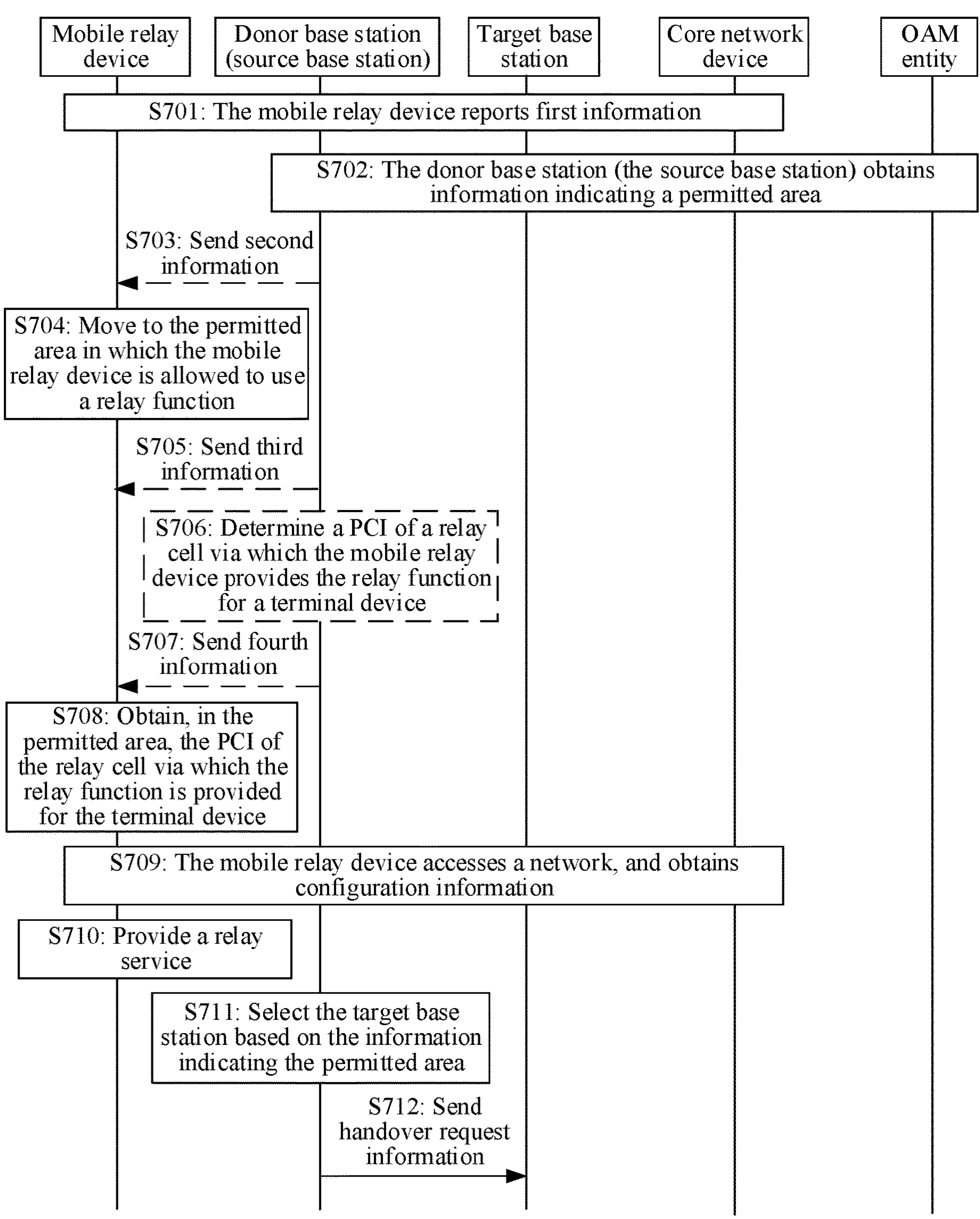
FIG. 7 is a flowchart of a method of obtaining information according to an embodiment of this application.

FIG. 7 is a flowchart of a method of obtaining information 700 according to an embodiment of this application. As shown in FIG. 7, the method 700 includes the following steps.

S701: A mobile relay device reports first information.

For example, the mobile relay device may report the first information, where the first information indicates at least one of a provider of the mobile relay device and an application layer service supported by the mobile relay device. In addition, the mobile relay device may alternatively report the first information in a process of completing initial registration with a network, and attach to a core network device. For example, the mobile relay device may attach the first information to registration request information, so that the mobile relay device reports the first information when sending the registration request information to the core network device.

Specifically, for a form of reporting the first information by the mobile relay device and related descriptions of the first information, refer to the form of reporting the first information by the mobile relay device and the descriptions of the first information in S301. For brevity, details are not described herein again in this application.

S702: A donor base station (a source base station) obtains information indicating a permitted area.

For example, the donor base station (the source base station) may obtain the information indicating the permitted area. The permitted area is a cell covered by the donor base station (the source base station). In the permitted area, the mobile relay device can be allowed to use a relay function.

Specifically, the donor base station (the source base station) may receive, from the core network device, the information indicating the permitted area, or may receive, from an OAM entity, the information indicating the permitted area. This is not limited herein in this application. For related descriptions of the information indicating the permitted area, refer to the related descriptions of the information indicating the permitted area in S202 or S401. For brevity, details are not described herein in this application.

S703: The donor base station (the source base station) sends second information to the mobile relay device. Accordingly, the mobile relay device receives the second information from the donor base station (the source base station).

Optionally, the mobile relay device may receive the second information sent by the donor base station (the source base station), where the second information indicates the permitted area. Therefore, the mobile relay device may obtain the information about the permitted area based on the second information.

Specifically, for descriptions of the second information and the information about the permitted area, refer to the descriptions related to the second information and the information about the permitted area in S202. For brevity, details are not described herein again in this application.

It should be understood that the mobile relay device may alternatively receive second information from the core network device in the process of the initial registration. For example, the mobile relay device may receive registration accept information from the core network device, where the registration accept information includes the second information, so that the mobile relay device can obtain the second information (for example, the core network device sends the second information to the mobile relay device through an access and mobility management function (AMF) entity by using NAS signaling). In addition, the mobile relay device may alternatively establish a connection to the OAM entity, and directly receive second information from the OAM entity. This is not limited herein in this application.

It should be further understood that, when receiving the information about the permitted area, the mobile relay device may also obtain, from the core network device or the OAM entity, basic configuration information that corresponds when the mobile relay device works as a mobile relay, for example, configuration information such as an operation frequency band and a system frame number.

S704: The mobile relay device moves to the permitted area in which the mobile relay device is allowed to use the relay function.

For example, the mobile relay device may move, based on the information about the permitted area, to the permitted area in which the mobile relay device is allowed to use the relay function.

In a possible implementation, the mobile relay device may obtain the information about the permitted area by receiving the second information indicating the permitted area, and move to the permitted area.

In another possible implementation, the information about the permitted area is preconfigured by the mobile relay device, and the mobile relay device may move to the permitted area based on the information about the permitted area.

S705: The donor base station (the source base station) sends third information to the mobile relay device. Accordingly, the mobile relay device receives the third information from the donor base station (the source base station).

Optionally, the mobile relay device may receive the third information from the donor base station (the source base station), where the third information indicates at least one (relay-type) PCI corresponding to the permitted area.

Specifically, the mobile relay device may obtain, by receiving the third information from the donor base station (the source base station), the at least one (relay-type) PCI corresponding to the permitted area. For descriptions of the third information, refer to the descriptions related to the third information in S204. For brevity, details are not described herein in this application.

S706: The donor base station (the source base station) determines a PCI of a relay cell through which the mobile relay device provides the relay function for a terminal device.

Optionally, the donor base station (the source base station) may determine, based on the information that is about the permitted area and that is from the OAM entity and the first information from the mobile relay device, the PCI of the relay cell through which the mobile relay device provides the relay function for the terminal device.

S707: The donor base station (the source base station) sends fourth information to the mobile relay device. Accordingly, the mobile relay device receives the fourth information from the donor base station (the source base station).

Optionally, after determining the PCI of the relay cell through which the mobile relay device provides the relay function for the terminal device, the donor base station (the source base station) may send the fourth information to the mobile relay device, where the fourth information indicates the PCI of the relay cell through which the mobile relay device provides the relay function for the terminal device.

It should be understood that, in the foregoing solution, if S703 is performed, S706, S707, and S708 are not performed; if S706 is performed, S703, S707, and S708 are not performed; or if S707 and S708 are performed, S703 and S706 are not performed.

S708: The mobile relay device obtains, in the permitted area, the PCI of the relay cell through which the relay function is provided for the terminal device.

For example, the mobile relay device may obtain, in the permitted area, the PCI of the relay cell through which the relay function is provided for the terminal device, thereby providing the relay function for the terminal device.

In a possible implementation (that is, when S703 is performed), the mobile relay device may obtain, based on the second information, the PCI of the relay cell through which the relay function is provided for the terminal device.

Specifically, for descriptions in which the mobile relay device obtains, based on the second information, the PCI of the relay cell through which the relay function is provided for the terminal device, refer to the related descriptions in which the mobile relay device obtains, based on the second information, the PCI of the relay cell through which the relay function is provided for the terminal device in S204. For brevity, details are not described herein again in this application.

In another possible implementation (that is, when S706 is performed), the mobile relay device obtains, by receiving the third information from the donor base station (the source base station), the PCI of the relay cell through which the relay function is provided for the terminal device. The third information indicates the at least one (relay-type) PCI corresponding to the permitted area.

Specifically, for descriptions in which the mobile relay device obtains, by receiving the third information from the donor base station (the source base station), the PCI of the relay cell through which the relay function is provided for the terminal device, refer to the related descriptions in which the mobile relay device obtains, based on the third information, the PCI of the relay cell through which the relay function is provided for the terminal device in S204. For brevity, details are not described herein again in this application.

In another possible implementation (that is, when S707 and S708 are performed), the mobile relay device obtains, by receiving the fourth information from the donor base station (the source base station), the PCI of the relay cell through which the relay function is provided for the terminal device. The fourth information indicates the PCI of the relay cell through which the mobile relay device provides the relay function for the terminal device. Further, the fourth information is information sent by a network device in a broadcast form.

Specifically, after receiving the first information from the mobile relay device, the donor base station (the source base station) allocates, to the mobile relay device with reference to the information about the permitted area, the PCI of the relay cell through which the relay function is provided for the terminal device. Then, the mobile relay device obtains, by receiving the fourth information indicating the PCI of the relay cell through which the mobile relay device provides the relay function for the terminal device, the PCI of the relay cell through which the relay function is provided for the terminal device.

S709: The mobile relay device accesses the network, and obtains configuration information.

For example, the mobile relay device may access the network, and obtain the configuration information from the donor base station. The configuration information may be different from the basic configuration information in step S703 (that is, a configuration is updated), and latest configuration information is used. In addition, re-authentication may be performed on the mobile relay device to determine that the mobile relay device may provide a relay service in a current area.

S710: The mobile relay device provides the relay service.

For example, after accessing the network and obtaining the configuration information, the mobile relay device may start to work as a mobile relay, to provide the relay service.

S711: The donor base station (the source base station) selects a target base station based on the information indicating the permitted area.

For example, the donor base station (the source base station) may select the appropriate target base station for the mobile relay device based on the information indicating the permitted area of the mobile relay device.

S712: The donor base station (the source base station) sends handover request information to the target base station. Accordingly, the target base station receives the handover request information from the donor base station (the source base station).

For example, after the donor base station (the source base station) selects the target base station, the donor base station (the source base station) may send the handover request message to the target base station, to request the mobile relay device to be handed over from the donor base station (the source base station) to the target base station. Further, the handover request message may include the information about the permitted area, to be used as reference information for next time of base-station switching of the mobile relay device.

It should be understood that, in a base-station switching process of the mobile relay device, the donor base station (the source base station) may be caused to change. Therefore, based on the form of the information about the permitted area in S202, it can be learned that the change of the donor base station (the source base station) may cause a change of the PCI of the relay cell through which the mobile relay device provides the relay function for the terminal device. In this case, the terminal device served by the mobile relay device needs to be notified to update the PCI, to satisfy a subsequent communication requirement. Notification methods may include the following methods:

(1) The mobile relay device may notify, by using a paging message, the served terminal device that a system message is updated, and the terminal device may obtain an updated PCI by obtaining a broadcast message.

(2) The mobile relay device may notify, by using radio resource control (RRC) signaling, the terminal device served by the mobile relay device of an updated PCI.

Based on the foregoing solution, the mobile relay device can obtain, in the permitted area based on the second information from the donor base station (the source base station), based on the third information indicating the at least one (relay-type) PCI corresponding to the permitted area and a relay type of the mobile relay device, or based on the fourth information indicating the PCI of the relay cell through which the relay function is provided for the terminal device, the PCI of the relay cell through which the relay function is provided for the terminal device. The PCI of the at least one (relay-type) corresponding to the permitted area is configured and sent to the donor base station (the source base station) by the OAM entity, and the PCI that is of the relay cell through which the mobile relay device provides the relay function for the terminal device and that is indicated by the fourth information is determined by the donor base station (the source base station) based on the first information from the mobile relay device and the information that is about the permitted area and that is of the OAM entity. Finally, the donor base station (the source base station) can determine the target base station based on the information about the permitted area of the mobile relay device, and send the handover request information to the target base station. In this way, the mobile relay device can provide the relay service for the terminal device served by the mobile relay device, so that the mobile relay device can accurately provide the relay service in a working area when the mobile relay device serves as a vehicle-mounted base station relay when the vehicle is in motion. In addition, the donor base station (the source base station) is enabled to preferentially select a base station in the permitted area as the target base station, the mobile relay device can always serve as the relay as much as possible to provide a network connection or the relay service for the terminal device served by the mobile relay device. This also alleviates the problem of ensuring service continuity of the terminal device served by the mobile relay device in a movement process of the mobile relay device.

Figure 8:
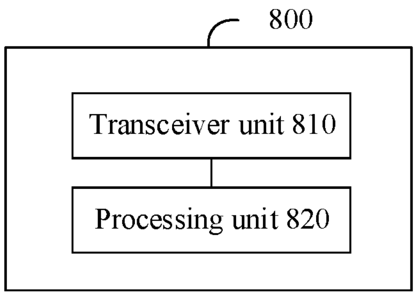
FIG. 8 is a schematic block diagram of a communication apparatus according to an embodiment of this application.
Figure 11:
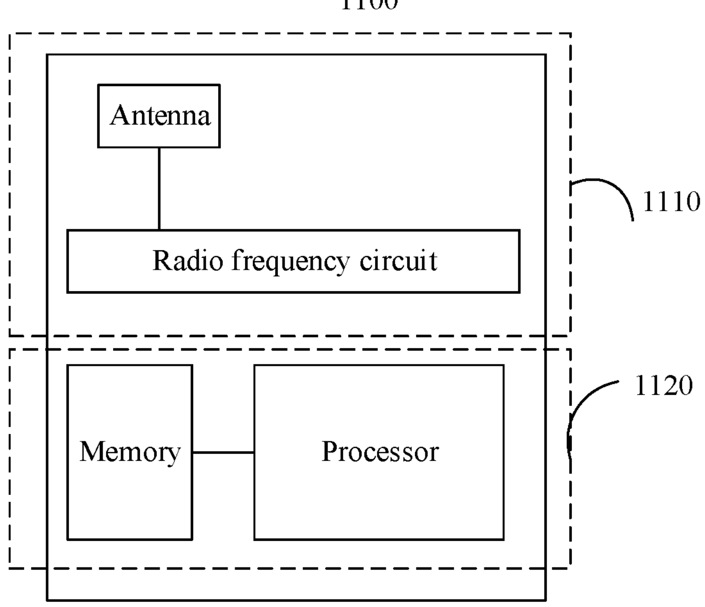
FIG. 11 is a simplified schematic diagram of a structure of a network device, a core network device, an OAM entity, a donor base station, or a target base station.

With reference to FIG. 2 to FIG. 7, the foregoing describes in detail the methods provided in embodiments of this application. With reference to FIG. 8 and FIG. 11, the following describes in detail communication apparatuses provided in embodiments of this application. It should be understood that descriptions of the apparatus embodiments correspond to the descriptions of the method embodiments. Therefore, for content that is not described in detail, refer to the foregoing method embodiments. For brevity, details are not described herein again.

The foregoing mainly describes the solutions provided in embodiments of this application from a perspective of interaction between the network elements. It may be understood that, to implement the foregoing functions, each network element such as a transmitting end device or a receiving end device includes a corresponding hardware structure and/or software module for performing each function. A person skilled in the art should be able to be aware that, in combination with the examples described in embodiments disclosed in this specification, units and algorithm steps can be implemented by hardware or a combination of hardware and computer hardware in this application. Whether a function is performed by hardware or hardware driven by computer software depends on particular applications and design constraints of the technical solutions. A person skilled in the art may use different methods to implement the functions for each particular application, but it should not be considered that the implementation goes beyond the scope of this application.

In embodiments of this application, the transmitting end device or the receiving end device division may be divided into function modules based on the foregoing method examples. For example, each function module may be obtained through division corresponding to each function, or two or more functions may be integrated in one processing module. The integrated module may be implemented in a form of hardware, or may be implemented in a form of a software function module. It should be noted that, in embodiments of this application, division into the modules is an example, and is merely logical function division. Another division methods may be used during an actual implementation. An example in which each function module is obtained through division corresponding to each function is used for description below.

FIG. 8 is a schematic block diagram of a communication apparatus according to an embodiment of this application. The communication apparatus 800 includes a transceiver unit 810 and a processing unit 820. The transceiver unit 810 may implement a corresponding communication function, and the processing unit 810 is configured to perform data processing. The transceiver unit 810 may also be referred to as a communication interface or a communication unit.

Optionally, the communication apparatus 800 may further include a storage unit. The storage unit may be configured to store instructions and/or data. The processing unit 820 may read the instructions and/or the data in the storage unit, to enable the communication apparatus to implement the foregoing method embodiments.

The communication apparatus 800 may be configured to perform actions performed by the mobile relay device in the foregoing method embodiments. In this case, the communication apparatus 800 may be a mobile relay device or a component that may be configured in the mobile relay device, the transceiver unit 810 is configured to perform operations related to sending and receiving on a mobile relay device side in the foregoing method embodiments, and the processing unit 820 is configured to perform processing-related operations on the mobile relay device side in the foregoing method embodiments.

Alternatively, the communication apparatus 800 may be configured to perform actions performed by the network device in the foregoing method embodiments. In this case, the communication apparatus 800 may be a network device or a component that may be configured in the network device, the transceiver unit 810 is configured to perform operations related to sending and receiving on a network device side in the foregoing method embodiments, and the processing unit 820 is configured to perform processing-related operations on the network device side in the foregoing method embodiments.

Alternatively, the communication apparatus 800 may be configured to perform actions performed by the donor base station in the foregoing method embodiments. In this case, the communication apparatus 800 may be a donor base station or a component that may be configured in the donor base station, the transceiver unit 810 is configured to perform operations related to sending and receiving on a donor base station side in the foregoing method embodiments, and the processing unit 820 is configured to perform processing-related operations on the donor base station side in the foregoing method embodiments.

Alternatively, the communication apparatus 800 may be configured to perform actions performed by the core network device in the foregoing method embodiments. In this case, the communication apparatus 800 may be a core network device or a component that may be configured in the core network device, the transceiver unit 810 is configured to perform operations related to sending and receiving on a core network device side in the foregoing method embodiments, and the processing unit 820 is configured to perform processing-related operations on the core network device side in the foregoing method embodiments.

Alternatively, the communication apparatus 800 may be configured to perform actions performed by the OAM entity in the foregoing method embodiments. In this case, the communication apparatus 800 may be an OAM entity or a component that may be configured in the OAM entity, the transceiver unit 810 is configured to perform operations related to sending and receiving on an OAM entity side in the foregoing method embodiments, and the processing unit 820 is configured to perform processing-related operations on the OAM entity side in the foregoing method embodiments.

Alternatively, the communication apparatus 800 may be configured to perform actions performed by the target base station in the foregoing method embodiments. In this case, the communication apparatus 800 may be a target base station or a component that may be configured in the target base station, the transceiver unit 810 is configured to perform operations related to sending and receiving on a target base station side in the foregoing method embodiments, and the processing unit 820 is configured to perform processing-related operations on the target base station side in the foregoing method embodiments.

In a design, the communication apparatus 800 is configured to perform actions performed by the mobile relay device in the embodiment shown in FIG. 2, the transceiver unit 810 is configured to perform S203 and S204, and the processing unit 820 is configured to perform S202.

In an example, the communication apparatus 800 is configured to perform actions performed by the mobile relay device in the embodiment shown in FIG. 3, the transceiver unit 810 is configured to perform S301, S302, and S305, and the processing unit 820 is configured to perform S303, S304, and S306.

In another example, the communication apparatus 800 is configured to perform actions performed by the mobile relay device in the embodiment shown in FIG. 4, the transceiver unit 810 is configured to perform S403 and S405, and the processing unit 820 is configured to perform S402, S404, and S406.

In another example, the communication apparatus 800 is configured to perform actions performed by the mobile relay device in the embodiment shown in FIG. 5, the transceiver unit 810 is configured to perform S503, S505, and S507, and the processing unit 820 is configured to perform S502, S506, and S508.

In another example, the communication apparatus 800 is configured to perform actions performed by the mobile relay device in the embodiment shown in FIG. 6, and the transceiver unit 810 is configured to perform S601.

In another example, the communication apparatus 800 is configured to perform actions performed by the mobile relay device in the embodiment shown in FIG. 7, the transceiver unit 810 is configured to perform S701, S703, S705, S707, and S709, and the processing unit 820 is configured to perform S704, S708, and S710.

The communication apparatus 800 may implement steps or procedures performed by the mobile relay device in the method 200 to the method 700 according to embodiments of this application. The communication apparatus 800 may include units configured to perform methods performed by the mobile relay device in the method 200 in FIG. 2 to the method 700 in FIG. 7. In addition, the units in the communication apparatus 800 and the foregoing other operations and/or functions are separately intended to implement corresponding procedures of the method 200 in FIG. 2 to the method 700 in FIG. 7.

When the communication apparatus 800 is configured to perform the method 200 in FIG. 2, the transceiver unit 810 may be configured to perform steps 203 and 204 in the method 400, and the processing unit 820 may be configured to perform step 202 in the method 200.

When the communication apparatus 800 is configured to perform the method 300 in FIG. 3, the transceiver unit 810 may be configured to perform steps 301, 302, and 305 in the method 300, and the processing unit 820 may be configured to perform steps 303, 304, and 306 in the method 300.

When the communication apparatus 800 is configured to perform the method 400 in FIG. 4, the transceiver unit 810 may be configured to perform steps 403 and 405 in the method 400, and the processing unit 820 may be configured to perform steps 402, 404, and 406 in the method 400.

When the communication apparatus 800 is configured to perform the method 500 in FIG. 5, the transceiver unit 810 may be configured to perform steps 503, 505, and 507 in the method 500, and the processing unit 820 may be configured to perform steps 502, 506, and 508 in the method 500.

When the communication apparatus 800 is configured to perform the method 600 in FIG. 6, the transceiver unit 810 may be configured to perform step 601 in the method 600.

When the communication apparatus 800 is configured to perform the method 700 in FIG. 7, the transceiver unit 810 may be configured to perform steps 701, 703, 705, 707, and 709 in the method 700, and the processing unit 820 may be configured to perform steps 704, 708, and 710 in the method 700.

It should be understood that a specific process in which the units perform the foregoing corresponding steps has been described in detail in the foregoing method embodiments. For brevity, details are not described herein again.

In another design, the communication apparatus 800 is configured to perform actions performed by the network device in the embodiment shown in FIG. 2, the transceiver unit 810 is configured to perform S203 and S204, and the processing unit 820 is configured to perform S201.

The communication apparatus 800 may implement steps or procedures performed by the network device in the method 200 according to embodiments of this application. The communication apparatus 800 may include units configured to perform a method performed by the network device in the method 200 in FIG. 2. In addition, the units in the communication apparatus 800 and the foregoing other operations and/or functions are separately intended to implement corresponding procedures of the method 200 in FIG. 2.

When the communication apparatus 800 is configured to perform the method 200 in FIG. 2, the transceiver unit 810 may be configured to perform steps 203 and 204 in the method 200, and the processing unit 820 may be configured to perform step 201 in the method 200.

It should be understood that a specific process in which the units perform the foregoing corresponding steps has been described in detail in the foregoing method embodiments. For brevity, details are not described herein again.

In another design, the communication apparatus 800 is configured to perform actions performed by the donor base station in the embodiment shown in FIG. 3, and the transceiver unit 810 is configured to perform S301, S302, and S305.

In another example, the communication apparatus 800 is configured to perform actions performed by the donor base station in the embodiment shown in FIG. 4, and the transceiver unit 810 is configured to perform S401 and S405.

In another example, the communication apparatus 800 is configured to perform actions performed by the donor base station in the embodiment shown in FIG. 5, the transceiver unit 810 is configured to perform S501, S503, S505, and S507, and the processing unit 820 is configured to perform S504.

In another example, the communication apparatus 800 is configured to perform actions performed by the donor base station in the embodiment shown in FIG. 6, the transceiver unit 810 is configured to perform S601 and S603, and the processing unit 820 is configured to perform S602.

In another example, the communication apparatus 800 is configured to perform actions performed by the donor base station in the embodiment shown in FIG. 7, the transceiver unit 810 is configured to perform S701, S702, S703, S705, S707, S709 and S712, and the processing unit 820 is configured to perform S706 and S711.

The communication apparatus 800 may implement steps or procedures performed by the donor base station in the method 200 to the method 700 according to embodiments of this application. The communication apparatus 800 may include units configured to perform methods performed by the donor base station in the method 200 in FIG. 2 to the method 700 in FIG. 7. In addition, the units in the communication apparatus 800 and the foregoing other operations and/or functions are separately intended to implement corresponding procedures of the method 200 in FIG. 2 to the method 700 in FIG. 7.

When the communication apparatus 800 is configured to perform the method 300 in FIG. 3, the transceiver unit 810 may be configured to perform steps 301, 302, and 305 in the method 300.

When the communication apparatus 800 is configured to perform the method 400 in FIG. 4, the transceiver unit 810 may be configured to perform steps 401 and 405 in the method 400.

When the communication apparatus 800 is configured to perform the method 500 in FIG. 5, the transceiver unit 810 may be configured to perform steps 501, 503, 505, and 507 in the method 500, and the processing unit 820 may be configured to perform step 504 in the method 500.

When the communication apparatus 800 is configured to perform the method 600 in FIG. 6, the transceiver unit 810 may be configured to perform steps 601 and 603 in the method 600, and the processing unit 820 may be configured to perform step 602 in the method 600.

When the communication apparatus 800 is configured to perform the method 700 in FIG. 7, the transceiver unit 810 may be configured to perform steps 701, 702, 703, 705, 707, 709, and 712 in the method 700, and the processing unit 820 may be configured to perform steps 706 and 711 in the method 700.

It should be understood that a specific process in which the units perform the foregoing corresponding steps has been described in detail in the foregoing method embodiments. For brevity, details are not described herein again.

In another design, the communication apparatus 800 is configured to perform actions performed by the core network device in the embodiment shown in FIG. 3, and the transceiver unit 810 is configured to perform S301 and S305.

In an example, the communication apparatus 800 is configured to perform actions performed by the core network device in the embodiment shown in FIG. 4, and the transceiver unit 810 is configured to perform S405.

In another example, the communication apparatus 800 is configured to perform actions performed by the core network device in the embodiment shown in FIG. 5, and the transceiver unit 810 is configured to perform S507.

In another example, the communication apparatus 800 is configured to perform actions performed by the core network device in the embodiment shown in FIG. 6, and the transceiver unit 810 is configured to perform S601.

In another example, the communication apparatus 800 is configured to perform actions performed by the core network device in the embodiment shown in FIG. 7, and the transceiver unit 810 is configured to perform S701, S702, and S709.

The communication apparatus 800 may implement steps or procedures performed by the core network device in the method 300 to the method 700 according to embodiments of this application. The communication apparatus 800 may include units configured to perform methods performed by the core network device in the method 300 in FIG. 3 to the method 700 in FIG. 7. In addition, the units in the communication apparatus 800 and the foregoing other operations and/or functions are separately intended to implement corresponding procedures of the method 300 in FIG. 3 to the method 700 in FIG. 7.

When the communication apparatus 800 is configured to perform the method 300 in FIG. 3, the transceiver unit 810 may be configured to perform steps 301 and 305 in the method 300.

When the communication apparatus 800 is configured to perform the method 400 in FIG. 4, the transceiver unit 810 may be configured to perform step 405 in the method 400.

When the communication apparatus 800 is configured to perform the method 500 in FIG. 5, the transceiver unit 810 may be configured to perform step 507 in the method 500.

When the communication apparatus 800 is configured to perform the method 600 in FIG. 6, the transceiver unit 810 may be configured to perform step 601 in the method 600.

When the communication apparatus 800 is configured to perform the method 700 in FIG. 7, the transceiver unit 810 may be configured to perform steps 701, 702, and 709 in the method 700.

It should be understood that a specific process in which the units perform the foregoing corresponding steps has been described in detail in the foregoing method embodiments. For brevity, details are not described herein again.

In another design, the communication apparatus 800 is configured to perform actions performed by the OAM entity in the embodiment shown in FIG. 3, and the transceiver unit 810 is configured to perform S302.

In an example, the communication apparatus 800 is configured to perform actions performed by the OAM entity in the embodiment shown in FIG. 4, and the transceiver unit 810 is configured to perform S401.

In another example, the communication apparatus 800 is configured to perform actions performed by the OAM entity in the embodiment shown in FIG. 5, and the transceiver unit 810 is configured to perform S501.

In another example, the communication apparatus 800 is configured to perform actions performed by the OAM entity in the embodiment shown in FIG. 6, and the transceiver unit 810 is configured to perform S601.

In another example, the communication apparatus 800 is configured to perform actions performed by the OAM entity in the embodiment shown in FIG. 7, and the transceiver unit 810 is configured to perform S702.

The communication apparatus 800 may implement steps or procedures performed by the OAM entity in the method 300 to the method 700 according to embodiments of this application. The communication apparatus 800 may include units configured to perform methods performed by the OAM entity in the method 300 in FIG. 3 to the method 700 in FIG. 7. In addition, the units in the communication apparatus 800 and the foregoing other operations and/or functions are separately intended to implement corresponding procedures of the method 300 in FIG. 3 to the method 700 in FIG. 7.

When the communication apparatus 800 is configured to perform the method 300 in FIG. 3, the transceiver unit 810 may be configured to perform step 302 in the method 300.

When the communication apparatus 800 is configured to perform the method 400 in FIG. 4, the transceiver unit 810 may be configured to perform step 401 in the method 400.

When the communication apparatus 800 is configured to perform the method 500 in FIG. 5, the transceiver unit 810 may be configured to perform step 501 in the method 500.

When the communication apparatus 800 is configured to perform the method 600 in FIG. 6, the transceiver unit 810 may be configured to perform step 601 in the method 600.

When the communication apparatus 800 is configured to perform the method 700 in FIG. 7, the transceiver unit 810 may be configured to perform step 702 in the method 700.

It should be understood that a specific process in which the units perform the foregoing corresponding steps has been described in detail in the foregoing method embodiments. For brevity, details are not described herein again.

In another design, the communication apparatus 800 is configured to perform actions performed by the target base station in the embodiment shown in FIG. 6, and the transceiver unit 810 is configured to perform S603.

In an example, the communication apparatus 800 is configured to perform actions performed by the target base station in the embodiment shown in FIG. 7, and the transceiver unit 810 is configured to perform S712.

The communication apparatus 800 may implement steps or procedures performed by the target base station in the method 600 and the method 700 according to embodiments of this application. The communication apparatus 800 may include units configured to perform methods performed by the target base station in the method 600 in FIG. 6 and the method 700 in FIG. 7. In addition, the units in the communication apparatus 800 and the foregoing other operations and/or functions are separately intended to implement corresponding procedures of the method 600 in FIG. 6 and the method 700 in FIG. 7.

When the communication apparatus 800 is configured to perform the method 600 in FIG. 6, the transceiver unit 810 may be configured to perform step 603 in the method 600.

When the communication apparatus 800 is configured to perform the method 700 in FIG. 7, the transceiver unit 810 may be configured to perform step 712 in the method 700.

It should be understood that a specific process in which the units perform the foregoing corresponding steps has been described in detail in the foregoing method embodiments. For brevity, details are not described herein again.

The processing unit 820 in the foregoing embodiment may be implemented by at least one processor or processor-related circuit. The transceiver unit 810 may be implemented by a transceiver or a transceiver-related circuit. The transceiver unit 810 may also be referred to as a communication unit or a communication interface. The storage unit may be implemented by at least one memory.

Figure 9:
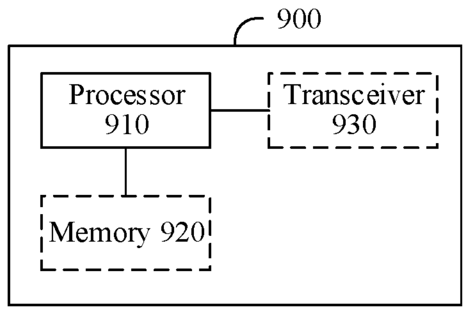
FIG. 9 is another schematic block diagram of a communication apparatus according to an embodiment of this application.

As shown in FIG. 9, an embodiment of this application further provides a communication apparatus 900. The communication apparatus 900 includes a processor 910. The processor 910 is coupled to a memory 920. The memory 920 is configured to store a computer program or instructions and/or data. The processor 910 is configured to execute the computer program or the instructions and/or the data stored in the memory 920, so that the methods in the foregoing method embodiments are performed.

Optionally, the communication apparatus 900 includes one or more processors 910.

Optionally, as shown in FIG. 9, the communication apparatus 900 may further include the memory 920.

Optionally, the communication apparatus 900 may include one or more memories 920.

Optionally, the memory 920 and the processor 910 may be integrated together or separately disposed.

Optionally, as shown in FIG. 9, the communication apparatus 900 may further include a transceiver 930, and the transceiver 930 is configured to receive and/or send a signal.

For example, the processor 910 is configured to control the transceiver 930 to receive and/or send the signal.

In a solution, the communication apparatus 900 is configured to perform operations performed by the terminal device in the foregoing method embodiments.

For example, the processor 910 is configured to implement processing-related operations performed by the terminal device in the foregoing method embodiments, and the transceiver 930 is configured to implement operations related to sending and receiving performed by the terminal device in the foregoing method embodiments.

In another solution, the communication apparatus 900 is configured to perform operations performed by the network device in the foregoing method embodiments.

For example, the processor 910 is configured to implement processing-related operations performed by the network device in the foregoing method embodiments, and the transceiver 930 is configured to implement operations related to sending and receiving performed by the network device in the foregoing method embodiments.

An embodiment of this application further provides a communication apparatus 1000. The communication apparatus 1000 may be a mobile relay device, or may be a chip. The communication apparatus 1000 may be configured to perform operations performed by the mobile relay device in the foregoing method embodiments.

Figure 10:
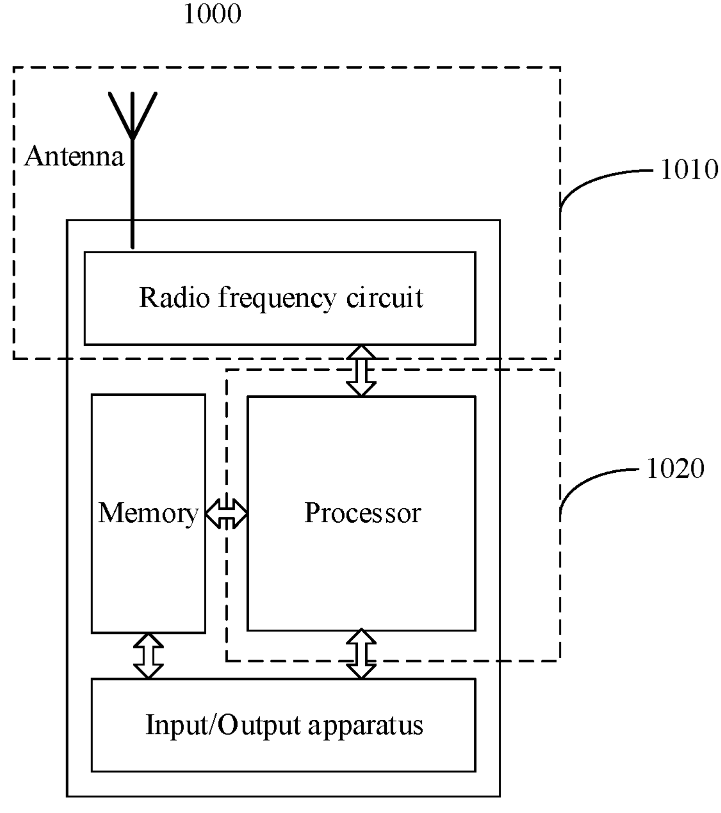
FIG. 10 is a simplified schematic diagram of a structure of a mobile relay device.

When the communication apparatus 1000 is the mobile relay device, FIG. 10 is a simplified schematic diagram of a structure of a mobile relay device. As shown in FIG. 10, the mobile relay device includes a processor, a memory, a radio frequency circuit, an antenna, and an input/output apparatus. The processor is mainly configured to: process a communication protocol and communication data, control the mobile relay device, execute a software program, process data of the software program, and the like. The memory is mainly configured to store the software program and the data. The radio frequency circuit is mainly configured to perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, or a keyboard, is mainly configured to receive data input by a user and output data to the user. It should be noted that some types of mobile relay devices may have no input/output apparatus.

When data needs to be sent, the processor performs baseband processing on the to-be-sent data, and outputs a baseband signal to the radio frequency circuit. After performing radio frequency processing on the baseband signal, the radio frequency circuit sends a radio frequency signal in the form of an electromagnetic wave through the antenna. When data is sent to the mobile relay device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 10 shows only one memory and one processor. In an actual mobile relay device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have a transceiver function may be considered as a transceiver unit of the mobile relay device, and the processor that has a processing function may be considered as a processing unit of the mobile relay device.

As shown in FIG. 10, the mobile relay device includes the transceiver unit 1010 and the processing unit 1020. The transceiver unit 1010 may also be referred to as a transceiver, a transceiver apparatus, or the like. The processing unit 1020 may also be referred to as a processor, a processing board, a processing module, a processing apparatus, or the like.

Optionally, a component configured to implement a receiving function in the transceiver unit 1010 may be considered as a receiving unit, and a component configured to implement a sending function in the transceiver unit 1010 may be considered as a sending unit. That is, the transceiver unit 1010 includes the receiving unit and the sending unit. The transceiver unit may also be sometimes referred to as a transceiver, a transceiver circuit, or the like. The receiving unit may also be sometimes referred to as a receiver, a receiving circuit, or the like. The sending unit may also be sometimes referred to as a transmitter, a transmitting circuit, or the like.

For example, in an implementation, the processing unit 1020 is configured to perform a processing action on a mobile relay device side in FIG. 2. For example, the processing unit 1020 is configured to perform a processing step in step 202 in FIG. 2, and the transceiver unit 1010 is configured to perform sending and receiving operations in steps 203 and 204 in FIG. 2.

For another example, in an implementation, the processing unit 1020 is configured to perform processing steps in steps 303, 304, and 306 in FIG. 3, and the transceiver unit 1010 is configured to perform sending and receiving operations in steps 301, 302, and 305 in FIG. 3.

For another example, in an implementation, the processing unit 1020 is configured to perform processing steps in steps 402, 404, and 406 in FIG. 4, and the transceiver unit 1010 is configured to perform sending and receiving operations in steps 403 and 405 in FIG. 4.

For another example, in an implementation, the processing unit 1020 is configured to perform processing steps in steps 502, 506, and 508 in FIG. 5, and the transceiver unit 1010 is configured to perform sending and receiving operations in steps 503, 505, and 507 in FIG. 5.

For another example, in an implementation, the transceiver unit 1010 is configured to perform sending and receiving operations in step 601 in FIG. 6.

For another example, in an implementation, the processing unit 1020 is configured to perform processing steps in steps 704, 708, and 710 in FIG. 7, and the transceiver unit 1010 is configured to perform sending and receiving operations in steps 701, 703, 705, 707, and 709 in FIG. 7.

It should be understood that FIG. 10 is merely an example instead of a limitation. The mobile relay device including the transceiver unit and the processing unit may not depend on the structure shown in FIG. 10.

When the communication apparatus 1000 is the chip, the chip includes a transceiver unit and a processing unit. The transceiver unit may be an input/output circuit or a communication interface. The processing unit may be a processor, a microprocessor, or an integrated circuit that is integrated on the chip.

An embodiment of this application further provides a communication apparatus 1100. The communication apparatus 1100 may be a network device, a core network device, an OAM entity, a donor base station, a target base station, or may be a chip. The communication apparatus 1100 may be configured to perform operations performed by the network device, the core network device, the OAM entity, the donor base station, or the target base station in the foregoing method embodiments.

When the communication apparatus 1100 is the network device, the core network device, the OAM entity, the donor base station, or the target base station, FIG. 11 is a simplified schematic diagram of a structure of a network device, a core network device, an OAM entity, a donor base station, or a target base station. A part 1110 and a part 1120 are included. The part 1110 is mainly configured to: send and receive a radio frequency signal and perform conversion between a radio frequency signal and a baseband signal. The part 1120 is mainly configured to perform baseband processing, controlling, and so on. The part 1110 may be usually referred to as a transceiver unit, a transceiver, a transceiver circuit, or the like. The part 1120 is usually a control center, may be usually referred to as a processing unit, and is configured to control the network device, the core network device, the OAM entity, the donor base station, or the target base station to perform related processing operations in the foregoing method embodiments.

The transceiver unit in the part 1110 may also be referred to as a transceiver or the like, and includes an antenna and a radio frequency circuit. The radio frequency circuit is mainly configured to perform radio frequency processing. Optionally, a component configured to implement a receiving function in the part 1110 may be considered as a receiving unit, and a component configured to implement a sending function may be considered as a sending unit. That is, the part 1110 includes the receiving unit and the sending unit. The receiving unit may also be referred to as a receiver, a receiving circuit, or the like. The sending unit may also be referred to as a transmitter, a transmitting circuit, or the like.

The part 1120 may include one or more boards, and each board may include one or more processors and one or more memories. The processor is configured to read and execute a program in the memory to implement a baseband processing function and control the base station. If there are a plurality of boards, the boards may be interconnected with each other to enhance a processing capability. In an optional implementation, a plurality of boards may share one or more processors, a plurality of boards share one or more memories, or a plurality of boards simultaneously share one or more processors.

For example, in an implementation, the transceiver unit in the part 1110 is configured to perform steps related to sending and receiving performed by the network device in the embodiment shown in FIG. 2, and the part 1120 is configured to perform processing-related steps performed by the network device in the embodiment shown in FIG. 2.

For example, in another implementation, the transceiver unit in the part 1110 is configured to perform steps related to sending and receiving performed by the core network device, the OAM entity, or the donor base station in the embodiment shown in FIG. 3, and the part 1120 is configured to perform processing-related steps performed by the core network device, the OAM entity, or the donor base station in the embodiment shown in FIG. 3.

For example, in another implementation, the transceiver unit in the part 1110 is configured to perform steps related to sending and receiving performed by the core network device, the OAM entity, or the donor base station in the embodiment shown in FIG. 4, and the part 1120 is configured to perform processing-related steps performed by the core network device, the OAM entity, or the donor base station in the embodiment shown in FIG. 4.

For example, in another implementation, the transceiver unit in the part 1110 is configured to perform steps related to sending and receiving performed by the core network device, the OAM entity, or the donor base station in the embodiment shown in FIG. 5, and the part 1120 is configured to perform processing-related steps performed by the core network device, the OAM entity, or the donor base station in the embodiment shown in FIG. 5.

For example, in another implementation, the transceiver unit in the part 1110 is configured to perform steps related to sending and receiving performed by the core network device, the OAM entity, the donor base station, or the target base station in the embodiment shown in FIG. 6, and the part 1120 is configured to perform processing-related steps performed by the core network device, the OAM entity, the donor base station, or the target base station in the embodiment shown in FIG. 6.

For example, in another implementation, the transceiver unit in the part 1110 is configured to perform steps related to sending and receiving performed by the core network device, the OAM entity, the donor base station, or the target base station in the embodiment shown in FIG. 7, and the part 1120 is configured to perform processing-related steps performed by the core network device, the OAM entity, the donor base station, or the target base station in the embodiment shown in FIG. 7.

It should be understood that FIG. 11 is merely an example instead of a limitation. The network device, the core network device, the OAM entity, the donor base station, or the target base station that includes the transceiver unit and the processing unit may not depend on the structure shown in FIG. 11.

When the communication apparatus 1100 is the chip, the chip includes a transceiver unit and a processing unit. The transceiver unit may be an input/output circuit or a communication interface. The processing unit is a processor, a microprocessor, or an integrated circuit integrated on the chip.

An embodiment of this application further provides a computer-readable storage medium. The computer-readable storage medium stores computer instructions for implementing methods performed by the terminal device or methods performed by the network device, the core network device, the OAM entity, the donor base station, or the target base station in the foregoing method embodiments.

For example, when a computer program is executed by a computer, the computer is enabled to implement the methods performed by the terminal device or the methods performed by the network device, the core network device, the OAM entity, the donor base station, or the target base station in the foregoing method embodiments.

An embodiment of this application further provides a computer program product including instructions. When the instructions are executed by a computer, the computer is enabled to implement methods performed by the terminal device or methods performed by the network device, the core network device, the OAM entity, the donor base station, or the target base station in the foregoing method embodiments.

An embodiment of this application further provides a communication system. The communication system includes the network device, the core network device, the OAM entity, the donor base station, and/or the target base station, and the terminal device in the foregoing embodiments.

It may be clearly understood by a person skilled in the art that for convenient and brief description, for explanations and beneficial effects of related content in any communication apparatus provided above, refer to the corresponding method embodiment provided above. Details are not described herein.

In embodiments of this application, the terminal device, the network device, the core network device, the OAM entity, the donor base station, or the target base station may include a hardware layer, an operating system layer running above the hardware layer, and an application layer running above the operating system layer. The hardware layer may include hardware such as a central processing unit (CPU), a memory management unit (MMU), and a memory (which is also referred to as a main memory). An operating system at the operating system layer may be any one or more computer operating systems that implement service processing through a process, for example, a Linux operating system, a Unix operating system, an Android operating system, an iOS operating system, or a Windows operating system. The application layer may include applications such as a browser, an address book, word processing software, and instant messaging software.

A specific structure of an execution body of the method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by the terminal device, the network device, the core network device, the OAM entity, the donor base station, the target base station, or a function module that can invoke and execute the program in the terminal device, the network device, the core network device, the OAM entity, the donor base station, or the target base station.

Aspects or features of this application may be implemented as a method, an apparatus, or a product that uses standard programming and/or engineering technologies. The term "product" used in this application may cover a computer program that can be accessed from any computer-readable component, carrier, or medium.

The computer-readable storage medium may be any usable medium accessible by a computer, or a data storage device, such as a server or a data center, integrating one or more usable media. For example, the usable media (in other words, computer readable media) may include but is not limited to various media that can store program code such as a magnetic medium or a magnetic storage component (for example, a floppy disk, a hard disk (for example, a removable hard disk), or a magnetic tape), an optical medium (for example, an optical disc, a compact disc (CD), or a digital versatile disk (DVD)), a smart card, a flash memory component (for example, an erasable programmable read-only memory (EPROM), a card, a stick, or a key drive), a semiconductor medium (for example, a solid-state drive (SSD)), a USB flash drive, a read-only memory (ROM), or a random access memory (RAM).

Various storage media described in this specification may indicate one or more devices and/or other machine-readable media that are configured to store information. The term "machine-readable media" may include but is not limited to a wireless channel, and various other media that can store, include, and/or carry instructions and/or data.

It should be understood that, the processor mentioned in embodiments of this application may be a central processing unit (CPU), or may be another general-purpose processor, a digital signal processor (DSP), an application specific integrated circuit (ASIC), a field programmable gate array (FPGA) or another programmable logic device, a discrete gate or a transistor logical device, a discrete hardware component, or the like. The general-purpose processor may be a microprocessor, or the processor may be any conventional processor or the like.

It should be further understood that the memory mentioned in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM). For example, the RAM can be used as an external cache. By way of example but not limitation, the RAM may include the following plurality of forms: a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is the general-purpose processor, the DSP, the ASIC, the FPGA or the other programmable logic device, the discrete gate or the transistor logic device, or the discrete hardware component, the memory (a storage module) may be integrated into the processor.

It should be further noted that the memory described in this specification is to include but is not limited to these memories and a memory of any other proper type.

In the several embodiments provided in this application, it should be understood that the disclosed apparatuses and methods may be implemented in other manners. For example, the foregoing apparatus embodiments are merely examples. For example, division into the units is merely logical function division, and other divisions may be used during an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The foregoing units described as separate parts may or may not be physically separate, and parts displayed as units may or may not be physical units, may be located in one position, or may be distributed on a plurality of network units. Some or all of the units may be selected based on an actual requirement to implement the solutions provided in this application.

In addition, functional units in embodiments of this application may be integrated into one processing unit, each of the units may exist alone physically, or two or more units may be integrated into one unit.

All or some of the foregoing embodiments may be implemented by using software, hardware, firmware, or any combination thereof.

When the software is used to implement embodiments, all or some of embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. For example, the computer may be a personal computer, a server, or a network device. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. For the computer-readable storage medium, refer to the foregoing descriptions.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims and this specification.

What is claimed is:

1. A method, comprising:

moving, by a mobile relay device, to a permitted area in which the mobile relay device is allowed to use a relay function, wherein the permitted area is a cell covered by a donor base station; and obtaining, by the mobile relay device in the permitted area, a physical cell identifier (PCI) of a relay cell accessed by a terminal device and through which the relay function is provided for the terminal device, wherein the PCI of the relay cell is determined based on at least one of: a radio access network area code broadcast by the donor base station, or a PCI of a donor cell broadcast by the donor base station.

2. The method according to claim 1, further comprising:

sending, by the mobile relay device, first information to a network device, wherein the first information indicates at least one of a provider of the mobile relay device and an application layer service supported by the mobile relay device.

3. The method according to claim 1, further comprising:

receiving, by the mobile relay device, second information from the network device, wherein the second information indicates the permitted area; and obtaining, by the mobile relay device, the PCI of the relay cell comprises:

obtaining, by the mobile relay device based on the second information, the PCI of the relay cell.

4. The method according to claim 2, wherein obtaining, by the mobile relay device, the PCI of the relay cell comprises:

receiving, by the mobile relay device, third information from the network device, wherein the third information indicates at least one PCI corresponding to the permitted area; and obtaining, by the mobile relay device based on the at least one PCI corresponding to the permitted area and the first information, the PCI of the relay cell.

5. The method according to claim 2, wherein obtaining, by the mobile relay device, the PCI of the relay cell comprises:

receiving, by the mobile relay device, fourth information from the network device, wherein the fourth information indicates the PCI of the relay cell.

6. The method according to claim 2, wherein the network device comprises at least one of the donor base station, a core network device, or an operation, administration, and maintenance entity.

7. An apparatus for use as a mobile relay device, comprising:

at least one processor and at least one memory storing instructions, wherein the instructions are executed by the at least one processor to cause the apparatus to:

move to a permitted area in which the mobile relay device is allowed to use a relay function, wherein the permitted area is a cell covered by a donor base station; and obtain in the permitted area, a physical cell identifier (PCI) of a relay cell accessed by a terminal device and through which the relay function is provided for the terminal device, wherein the PCI of the relay cell is determined based on at least one of: a radio access network area code broadcast by the donor base station, or a PCI of a donor cell broadcast by the donor base station.

8. The apparatus according to claim 7, wherein the instructions executed by the at least one processor cause the apparatus to further:

send first information to a network device, wherein the first information indicates at least one of a provider of the mobile relay device and an application layer service supported by the mobile relay device.

9. The apparatus according to claim 7, wherein the instructions executed by the at least one processor cause the apparatus to further:

receive second information from the network device, wherein the second information indicates the permitted area; and obtaining the PCI of the relay cell comprises:

obtaining, based on the second information, the PCI of the relay cell.

10. The apparatus according to claim 8, wherein obtaining the PCI of the relay cell comprises:

receiving third information from the network device, wherein the third information indicates at least one PCI corresponding to the permitted area; and obtaining, based on the at least one PCI corresponding to the permitted area and the first information, the PCI of the relay cell.

11. The apparatus according to claim 8, wherein obtaining the PCI of the relay cell comprises:

receiving fourth information from the network device, wherein the fourth information indicates the PCI of the relay cell.

12. The apparatus according to claim 8, wherein the network device comprises at least one of the donor base station, a core network device, or an operation, administration, and maintenance entity.

13. An apparatus for use as a network device, comprising:

at least one processor and at least one memory storing instructions, wherein the instructions are executed by the at least one processor to cause the apparatus to:

determine a permitted area in which a mobile relay device is allowed to use a relay function, wherein the permitted area is a cell covered by a donor base station; and determine that the mobile relay device has moved to the permitted, wherein the PCI of the relay cell is determined based on at least one of: a radio access network area code broadcast by the donor base station, or a PCI of a donor cell broadcast by the donor base station.

14. The apparatus according to claim 13, wherein the instructions executed by the at least one processor cause the apparatus to further:

receive first information from the mobile relay device, wherein the first information indicates at least one of a provider of the mobile relay device and an application layer service supported by the mobile relay device.

15. The apparatus according to claim 13, wherein the instructions executed by the at least one processor cause the apparatus to further:

send second information to the mobile relay device, wherein the second information indicates the permitted area.

16. The apparatus according to claim 14, wherein the instructions executed by the at least one processor cause the apparatus to further:

send third information to the mobile relay device, wherein the third information indicates at least one PCI corresponding to the permitted area.

17. The apparatus according to claim 14, wherein the instructions executed by the at least one processor cause the apparatus to further:

determining fourth information, wherein the fourth information indicates a PCI of a relay cell via which the mobile relay device provides the relay function for a terminal device; and send the fourth information to the mobile relay device.

18. The apparatus according to claim 13, wherein the network device comprises at least one of the donor base station, a core network device, or an operation, administration, and maintenance entity.

19. A method of sending information, the method comprising:

determining, by a network device, that a mobile relay device has moved to a cell, covered by a donor base station, in which the mobile relay device is allowed to use a relay function;

sending to the mobile relay device, by the network device, notification information indicating the mobile relay device to obtain a physical cell identifier (PCI) of a relay cell through which the relay function is provided for a terminal device, wherein the PCI of the relay cell is determined based on at least one of: a radio access network area code broadcast by the donor base station, or a PCI of a donor cell broadcast by the donor base station.

20. The method of claim 19, further comprising receiving from the mobile relay device, by the network device, first information indicating at least one of a provider of the mobile relay device and an application layer service supported by the mobile relay device.

* * * * *